United States Patent
Porter et al.

(10) Patent No.: US 10,805,718 B1
(45) Date of Patent: Oct. 13, 2020

(54) MULTI-DEGREE OF FREEDOM TRANSDUCER VIBRATION ISOLATION SYSTEM

(71) Applicant: Facebook Technologies, LLC, Menlo Park, CA (US)

(72) Inventors: Scott Porter, Woodinville, WA (US); Peter Gottlieb, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/455,580

(22) Filed: Jun. 27, 2019

(51) Int. Cl.
| | |
|---|---|
| *H04R 1/02* | (2006.01) |
| *H04R 1/28* | (2006.01) |
| *F16F 7/104* | (2006.01) |
| *G02B 27/01* | (2006.01) |
| *H04R 9/06* | (2006.01) |
| *H04R 9/02* | (2006.01) |

(Continued)

(52) U.S. Cl.
CPC .......... *H04R 1/2896* (2013.01); *F16F 7/104* (2013.01); *F16M 13/02* (2013.01); *G02B 27/0176* (2013.01); *H04R 1/028* (2013.01); *H04R 9/025* (2013.01); *H04R 9/06* (2013.01); *F16F 7/108* (2013.01); *F16F 7/116* (2013.01); *F16F 2222/08* (2013.01); *F16F 2224/02* (2013.01); *F16F 2224/0208* (2013.01); *F16F 2224/0258* (2013.01); *G02B 2027/0178* (2013.01); *H04R 2460/13* (2013.01); *H04R 2499/11* (2013.01)

(58) Field of Classification Search
CPC ...... H04R 1/2896; H04R 1/028; H04R 9/025; H04R 9/06; H04R 2460/13; H04R 2499/11; F16F 7/104; F16F 7/108; F16F 7/116; F16F 2222/08; F16F 2224/02; F16F 2224/0208; F16F 2224/0258; F16M 13/02; G02B 27/0176; G02B 2027/0178
USPC ....................................... 381/334, 368, 333
See application file for complete search history.

(56) References Cited

U.S. PATENT DOCUMENTS

| | | |
|---|---|---|
| 6,956,957 B1 | 10/2005 | Azima et al. |
| 2002/0061115 A1 | 5/2002 | Chung et al. |

(Continued)

OTHER PUBLICATIONS

United States Office Action, U.S. Appl. No. 16/455,582, dated Mar. 4, 2020, 21 pages.

(Continued)

*Primary Examiner* — Ammar T Hamid
(74) *Attorney, Agent, or Firm* — Fenwick & West LLP

(57) ABSTRACT

A transducer system isolates vibrations produced by a transducer. The transducer system comprises the transducer and a vibration isolation system. The transducer can produce vibrations and is configured to be coupled to a device. The transducer includes a first sub-assembly including a coil assembly and a second sub-assembly including one or more magnets. The vibration isolation system is configured to isolate vibrations produced by the transducer from the device. The vibration isolation system includes a plurality of support brackets, and a suspension component including a plurality of flexures. The plurality of flexures includes a first set of flexures configured to suspend the first sub-assembly from the support brackets, a second set of flexures configured to suspend the second sub-assembly from the first sub-assembly, and a third set of flexures configured to suspend the second sub-assembly from the support brackets.

18 Claims, 23 Drawing Sheets

(51) Int. Cl.
*F16M 13/02* (2006.01)
*F16F 7/116* (2006.01)
*F16F 7/108* (2006.01)

(56) References Cited

U.S. PATENT DOCUMENTS

| | | |
|---|---|---|
| 2004/0076309 A1 | 4/2004 | Sahyoun |
| 2011/0188697 A1 | 8/2011 | Chu |
| 2011/0255732 A1 | 10/2011 | Kwon et al. |
| 2016/0057543 A1 | 2/2016 | Salvatti et al. |
| 2016/0100254 A1 | 4/2016 | Bae et al. |
| 2016/0227328 A1* | 8/2016 | van Halteren ......... H04R 11/04 |
| 2017/0280233 A1* | 9/2017 | Dominijanni ............ H04R 9/06 |
| 2017/0353800 A1 | 12/2017 | Lee et al. |
| 2019/0215603 A1* | 7/2019 | Timothy ................ H04R 9/025 |
| 2019/0239006 A1* | 8/2019 | Petersen .............. H04R 25/453 |
| 2019/0266247 A1 | 8/2019 | Osterhout |

OTHER PUBLICATIONS

United States Office Action, U.S. Appl. No. 16/455,582, dated Jun. 24, 2020, 22 pages.

\* cited by examiner

US 10,805,718 B1

MULTI-DEGREE OF FREEDOM TRANSDUCER VIBRATION ISOLATION SYSTEM

BACKGROUND

The present disclosure generally relates to transducers, and specifically to systems that incorporate multiple degrees-of-freedom for isolating vibrations from transducers.

As consumer electronics devices become more personal and wearable, internal components are becoming increasingly proximate to each other, which can result in undesirable couplings (sometimes called as co-existence issues) between components. Mechanical and acoustomechanical components can often be aggressors in these scenarios, transferring unwanted excitation energy into 1) sensors such as cameras, accelerometers or inertial measurement units (IMUs), microphones, 2) other mechanical components, 3) resonant structures, and/or 4) the device user, which can be perceived unfavorably by the device user. In addition, personal consumer electronics devices typically have small form factors to improve the comfort and aesthetics for the device user. As such, there is limited space within a consumer electronics device, which further exacerbates the co-existence issues between components and limits the ability to introduce additional components to isolate vibrations produced by various components.

SUMMARY

Embodiments relate to a transducer system for isolating vibrations produced by a transducer. The transducer system may be coupled to an eyewear device that may be part of an artificial reality system. In some embodiments, the transducer system includes a transducer and a vibration isolation system. The is transducer configured to produce vibrations (e.g., as it actuates to provide audio content to a user). The transducer includes a first sub-assembly including a coil assembly, and a second sub-assembly including one or more magnets.

The vibration isolation system is configured to isolate vibrations produced by the transducer from the device. The vibration isolation system includes a plurality of support brackets and a suspension component that includes a plurality of flexures. The plurality of flexures include a first set of flexures, a second set of flexures, and third set of flexures. The first set of flexures is configured to suspend the first sub-assembly from the support brackets. The second set of flexures is configured to suspend the second sub-assembly from the first sub-assembly. And the third set of flexures is configured to suspend the second sub-assembly from the support brackets.

Figure 1:
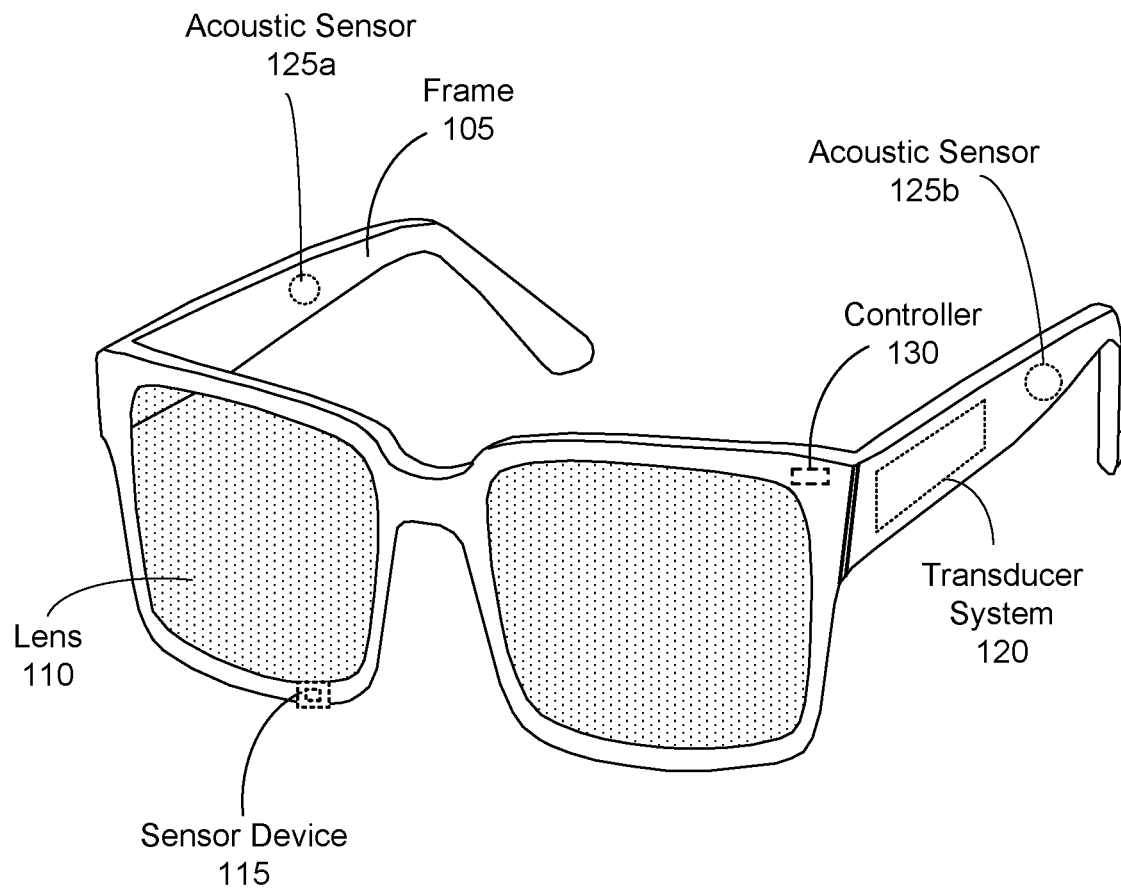
FIG. 1 is an example illustrating an eyewear device, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The mechanical behavior of a traditional loudspeaker transducer can be reasonably-well represented by a single lumped mass (single degree-of-freedom) and a single lumped compliance. Adding additional degrees of freedom (mobile masses) will not only add lumped-element resonances but, when designed correctly, can serve as a vibration isolation system between a transducer and a non-fixed mechanical structure (for example, the frames on a pair of glasses) it is mounted to. The vibration isolation system lessens the degree to which vibrations produced by the transducer are transferred to the structure it is mounted on. Transducers are electrical components that convert one form of energy into another form. For example, transducers (e.g., a voice-coil motor) may convert an electrical signal into a mechanical movement, or vice versa. The transducer system may be attached to a device, e.g., an eyewear device, a headset, or other similar devices. To minimize the effect of the vibrations of the transducer on other components of the device (i.e., co-existence issues), the vibration isolation system uses an integrated configuration of masses and springs (also referred to as flexures) to internally absorb the backward vibrations of the transducer. In other words, a resonance of different components of the transducer system offset each other such that the vibrations of the transducer are not undesirably transmitted to other components (i.e., a device to which the transducer system is coupled). In some embodiments, the vibration isolation system is a system having two degrees of freedom (DOF) that is composed of a configuration of masses and springs. When a transducer is mounted to the device and the device is considered to represent a mass load, the system is a three degree-of-freedom system. The vibration isolation system includes three springs that each attach to different components of the transducer system. The springs are intended to enable each mass to have a single dominant degree-of-freedom. In practice, these masses may exhibit other unintended degrees-of-freedom, e.g. rocking modes. The springs may be oriented in a parallel manner such that each axis corresponds to a same dimension. In this configuration, a resonance of the components along each axis offsets each other, thereby isolating vibrations produced by the transducer. Integrating the isolation system into the transducer (as opposed to using separate components) leverages the existing motor mass of the transducer (important for lightweight systems where adding more mass is discouraged), allows the specific tuning of the isolation system to be done at the component level, allows the performance of the isolation system to be verified at the component level, and enables the system to have a compact form factor.

In some embodiments, the transducer includes a first sub-assembly including a coil assembly and a second sub-assembly including one or more magnets. The magnets may include hard and/or soft magnets. As described in detail below, current supplied to the coil assembly causes it to move relative to the second assembly.

The vibration isolation system is configured to isolate vibrations produced by the transducer from a device the transducer system is coupled to. The vibration isolation system includes a plurality of support brackets and a suspension component that includes a plurality of flexures. A flexure includes one or more flexure segments. A flexure segment is a flexing element of a flexure of a suspension component. The plurality of flexures includes a first set of flexures configured to suspend the first sub-assembly from the support brackets; a second set of flexures configured to suspend the second sub-assembly from the first sub-assembly; and a third set of flexures configured to suspend the second sub-assembly from the support brackets.

The support brackets are intended to be rigidly tied to the mass of the device. Each flexure has a pre-determined spring constant such that resonances of plurality of flexures offset vibrations produced by the transducer such that the transducer is isolated from the device.

The suspension component may be formed from a single piece of planar material, e.g., sheet metal that is formed to create the first spring and the second spring, shape-memory alloy, plastic, etc. The sheet metal may be formed via bending, roll forming, deep drawing, stretch forming, shape-setting, or other suitable manufacturing processes. The sheet metal may be pre-processed or post-processed to create various segments of the first spring and the second spring. In addition to mechanical suspensions, within the single piece of planar material there may be incorporated other features which could be formed to serve as a mechanical chassis for the transducer or a former for locating elements of the first sub-assembly (e.g., voice coil) adjacent to the second sub-assembly (e.g. the magnetic structure). The suspension component comprises a first spring assembly and a second spring assembly defined by a first axis that bisects the body. In some embodiments, the suspension component is substantially symmetrical about the first axis. The first spring assembly and the second spring assembly each comprise a plurality of flexures. Each flexure has a respective effective spring constant. The number, geometry, and arrangement of flexure segments of each spring may vary in various embodiments.

In some embodiments, one or more of the plurality of flexures of the suspension component are composed of a conductive material and are configured to provide electrical signals to the transducer. The electrical signals may be control signals and/or power for the transducer or for other sensors or electrical components (e.g. amplifiers) embedded in the transducer design.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Eyewear Device Configuration

FIG. 1 is an example illustrating an eyewear device 100, in accordance with one or more embodiments. The eyewear device 100 presents media to a user. Examples of media presented by the eyewear device 100 include one or more images, video, audio, or some combination thereof. In one embodiment, the eyewear device 100 may be a near-eye display (NED). In embodiments (not shown) the eyewear device 100 may be a head-mounted display. The eyewear device 100 may include, among other components, a frame 105, a lens 110, a sensor device 115, an audio system, and a transducer system 120. The audio system may include, among other components, one or more acoustic sensors 125 and a controller 130. The transducer system may include, among other components, a transducer and a vibration isolation system, discussed in further detail with regard to FIGS. 2-3. While FIG. 1 illustrates the components of the eyewear device 100 in example locations on the eyewear device 100, the components may be located elsewhere on the eyewear device 100, on a peripheral device paired with the eyewear device 100, or some combination thereof.

The eyewear device 100 may correct or enhance the vision of a user, protect the eye of a user, or provide images to a user. The eyewear device 100 may be eyeglasses which correct for defects in a user's eyesight. The eyewear device 100 may be sunglasses which protect a user's eye from the sun. The eyewear device 100 may be safety glasses which protect a user's eye from impact. The eyewear device 100 may be a night vision device or infrared goggles to enhance a user's vision at night. The eyewear device 100 may be a near-eye display that produces VR, AR, or MR content for the user. Alternatively, the eyewear device 100 may not include a lens 110 and may be a frame 105 with an audio system that provides audio (e.g., telephony, alerts, media, music, radio, podcasts) to a user.

The frame 105 includes a front part that holds the lens 110 and end pieces to attach to the user. The front part of the frame 105 bridges the top of a nose of the user. The end pieces (e.g., temples) are portions of the frame 105 that hold the eyewear device 100 in place on a user (e.g., each end piece extends over a corresponding ear of the user). The length of the end piece may be adjustable to fit different users. The end piece may also include a portion that curls behind the ear of the user (e.g., temple tip, ear piece).

The lens 110 provides or transmits light to a user wearing the eyewear device 100. The lens 110 may be prescription lens (e.g., single vision, bifocal and trifocal, or progressive) to help correct for defects in a user's eyesight. The prescription lens transmits ambient light to the user wearing the eyewear device 100. The transmitted ambient light may be altered by the prescription lens to correct for defects in the user's eyesight. The lens 110 may be a polarized lens or a tinted lens to protect the user's eyes from the sun. The lens 110 may be one or more waveguides as part of a waveguide display in which image light is coupled through an end or edge of the waveguide to the eye of the user. The lens 110 may include an electronic display for providing image light and may also include an optics block for magnifying image light from the electronic display. Additional detail regarding the lens 110 is discussed with regards to FIG. 9. The lens 110 is held by a front part of the frame 105 of the eyewear device 100.

The sensor device 115 generates one or more measurement signals in response to motion of the eyewear device 100. The sensor device 115 may be located on a portion of the frame 105 of the eyewear device 100. The sensor device 115 may include a position sensor, an inertial measurement unit (IMU), or both. Some embodiments of the eyewear device 100 may or may not include the sensor device 115 or may include more than one sensor device 115. In embodiments in which the sensor device 115 includes an IMU, the IMU generates fast calibration data based on measurement signals from the sensor device 115. Examples of sensor devices 115 include: one or more accelerometers, one or more gyroscopes, one or more magnetometers, another suitable type of sensor that detects motion, a type of sensor used for error correction of the IMU, or some combination thereof. The sensor device 115 may be located external to the IMU, internal to the IMU, or some combination thereof. The sensor device 115 may include multiple accelerometers to measure translational motion (forward/back, up/down, left/right) and multiple gyroscopes to measure rotational motion (e.g., pitch, yaw, roll).

The audio system detects and processes sounds within an environment surrounding the eyewear device 100. Some embodiments of the eyewear device 100 may or may not include the audio system. In the embodiment of FIG. 1, the audio system includes the plurality of acoustic sensors 125 and the controller 130. Each acoustic sensor is configured to detect sounds within a local area surrounding the microphone array. In some embodiments, some of the plurality of acoustic sensors 125 are coupled to a neckband coupled to the eyewear device 100. The controller 130 is configured to process the data collected by the acoustic sensors 125. The controller 130 may transmit data and commands to and from an artificial reality system. In some embodiments, the acoustic sensors 125 may provide audio feedback to a user in response to commands received from the artificial reality system.

The transducer system 120 is coupled to the frame 105. In the embodiment of FIG. 1, the transducer system 120 includes a transducer with an integrated vibration isolation system. The transducer is a component that converts a signal from one energy form to another energy form. Examples of transducers includes microphones, position sensors, pressure sensors, actuators, haptic engines, vibration alerts, speakers, tissue conduction, among others. The vibration isolation system isolates the vibrations produced by the transducer from a device to which the vibration isolation system is attached and/or coupled. In the embodiment of FIG. 1, the vibration isolation system isolates vibrations from the frame 105. Isolating vibrations produced by the transducer reduces the transmission of the vibrations to a user wearing the eyewear device 100, to other components of the eyewear device 100, or some combination thereof. The transducer system 120 is discussed in further detail with regards to FIGS. 2A-6D.

In some embodiments, the transducer system 120 is used to provide audio content to the user. Audio content may be, e.g., airborne audio content and/or tissue born audio content. For example, airborne audio content (i.e., sounds) may be generated by the transducer system being coupled to a diaphragm that vibrates with a transducer in the transducer system. The moving diaphragm generating the airborne audio content. In contrast, tissue born audio content provides audio content using tissue conduction. Tissue conduction includes one or both of bone conduction and cartilage conduction, that vibrates bone and/or cartilage to generate acoustic pressure waves in a tissue of a user.

A bone conduction audio system uses bone conduction for providing audio content to the ear of a user while keeping the ear canal of the user unobstructed. The bone conduction audio system includes a transducer assembly that generates tissue born acoustic pressure waves corresponding to the audio content by vibrating tissue in a user's head that includes bone. Tissue may include e.g., bone, cartilage, muscle, skin, etc. For bone conduction, the primary pathway for the generated acoustic pressure waves is through the bone of the head (bypassing the eardrum) directly to the cochlea. The cochlea turns tissue borne acoustic pressure waves into signals which the brain perceives as sound.

A cartilage conduction audio system uses cartilage conduction for providing audio content to an ear of a user. The cartilage conduction audio system includes a transducer assembly that is coupled to one or more portions of the auricular cartilage around the outer ear (e.g., the pinna, the tragus, some other portion of the auricular cartilage, or some combination thereof). The transducer assembly generates airborne acoustic pressure waves corresponding to the audio content by vibrating the one or more portions of the auricular cartilage. This airborne acoustic pressure wave may propagate toward an entrance of the ear canal where it would be detected by the ear drum. However, the cartilage conduction audio system is a multipath system that generates acoustic pressure waves in different ways. For example, vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. Additional details regarding bone conduction and/or cartilage conduction may be found at, e.g., U.S. patent application Ser. No. 15/967,924, filed on May 1, 2018, which in incorporated by reference in its entirety.

Figure 2A:
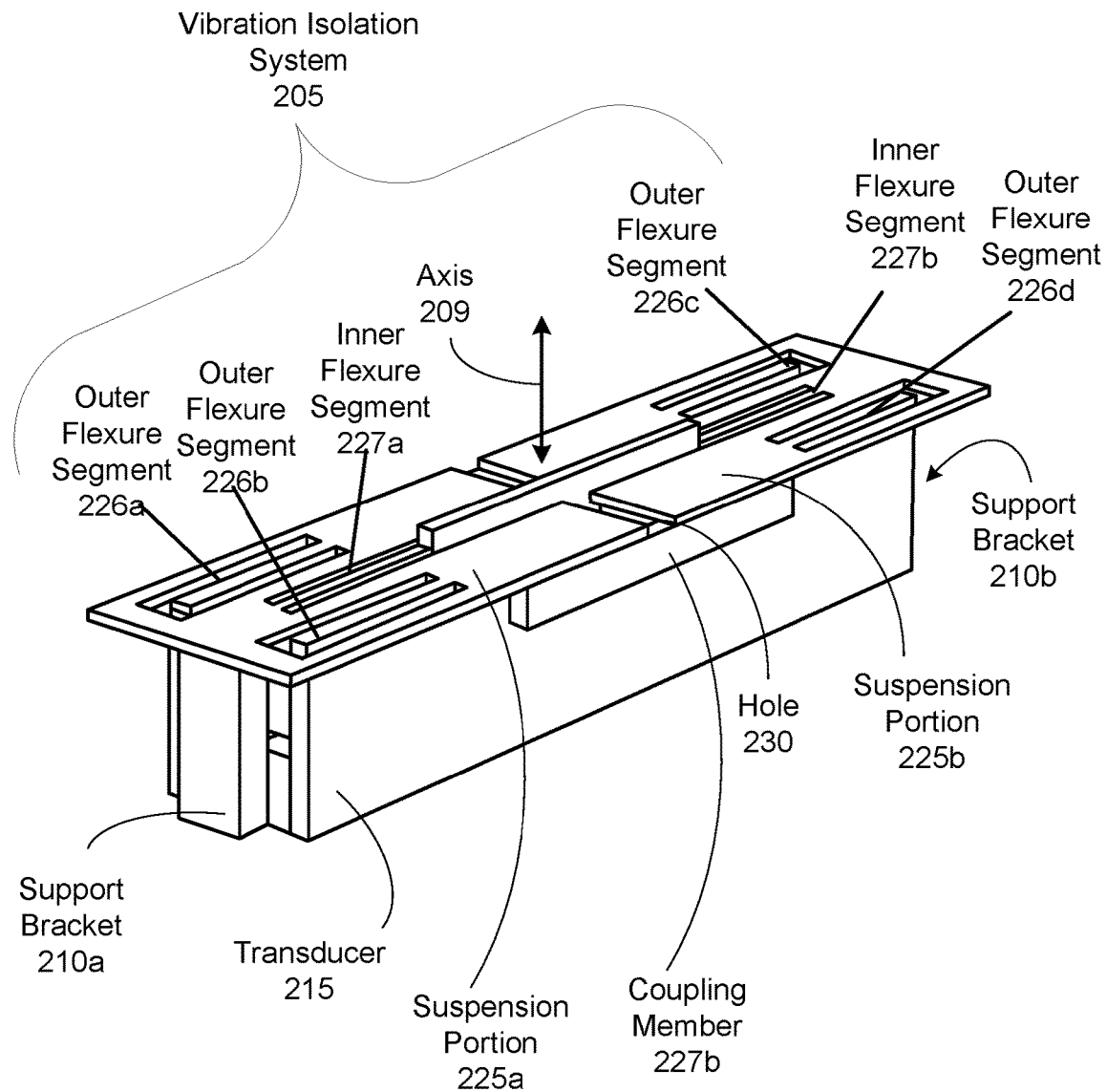
FIG. 2A is a perspective view of a transducer system, in accordance with one or more embodiments.

FIG. 2A is a perspective view of a transducer system 200, in accordance with one or more embodiments. In the embodiment of FIG. 2A, the transducer system 200 includes a transducer 215 integrated with a vibration isolation system. The transducer system 200 is an embodiment of the transducer system 120. As described with regard to FIG. 1, the vibration isolation system 205 isolates the vibrations produced by the transducer from a device to which the vibration isolation system 205 is attached. In the embodiment of FIG. 2A, the transducer substantially oscillates along an axis 209. The vibration isolation system 205 may be attached to a device (e.g., eyewear device 100) via one or more securing mechanisms, adhesives, mating interfaces, or some combination thereof. In some embodiments, the vibration isolation system 205 may be nested within a reciprocal cavity on the device. In the embodiment of FIG. 2A, the vibration isolation system 205 includes two support brackets 210a, 210b (210b not shown in FIG. 2), a suspension portion 225a, a suspension portion 225b, a coupling member 227a, and a coupling member 227b (shown in FIG. 2B). The suspension portion 225a, 225b further includes a series of flexures that couple to the transducer within the vibration isolation system 205. Note that in the illustrated embodiment the transducer system 200 is substantially symmetric with respect to an axis that bisects the support brackets 210a, 210b and is orthogonal to the axis 209.

The support brackets 210a, 210b (collectively referred to herein as "210") couple the vibration isolation system 205 to the device. The support brackets 210 are each positioned at or near an end of the vibration isolation system 205. As illustrated in FIG. 2A, the support brackets are columns that are substantially centered on respective short sides of the transducer 215. In one embodiment, the support brackets 210 may be hollow and designed to receive a screw that secures a base of each support bracket 210a, 210b to the device. In one embodiment, some portion of one or both support brackets 210 includes an adhesive surface. In alternate embodiments, the shape and dimensions of each support bracket 210a, 201b may vary. For example, each support bracket 210a, 210b may be planar, polygonal, or other suitable shapes. The support bracket 210a couples to the suspension portion 225a, and the support bracket 210b couples to the suspension portion 225b.

The suspension portions 225a, 225b (collectively referred to herein as "225") suspend the transducer 215 across the support brackets 210. The suspension portions 225 include a plurality of flexure segments each attached to different components of the transducer system 200. For example, the suspension portion 225a includes an outer flexure segment 226a, an outer flexure segment 226b, and an inner flexure segment 227a. And likewise, the suspension portion 225b includes an outer flexure segment 226c, an outer flexure segment 226d, and an inner flexure segment 227b. The outer flexure segments 226a, 226b, 226c, 226d (collectively referred to herein as "226") couple a second subassembly (includes one or more magnets) of the transducer 215 to the suspension portions 225. And the inner flexure segments 227a, 227b (collective referred to herein as "227") couple a first sub-assembly (includes a coil assembly) of the transducer 215 to the suspension portions 225. The flexure segments are configured to dampen vibrations in the transducer system 200 caused by motion of the transducer 215 along the axis 209. Some or all of the suspension portions 225 may be formed from, e.g., aluminum, brass, copper, steel, nickel, titanium, a shape memory alloy (e.g., nitinol), alloys, other suitable types of materials, or some combination thereof. In some embodiments where a shape memory alloy is used to form some or all of the suspension portions 225, the shape memory alloy would be such that its superelastic properties would be used. Superelasticity can help mitigate breakage and/or strain caused by long term cycling components (e.g., flexures) of the vibration isolation system 205 or from deformations outside normal operation limits due to the mechanical output faces being exposed to direct user contact.

Additionally, on each long side of the transducer system 200, the suspension portion 225a is coupled to the suspension portion 225b via coupling members. For example, on the side shown in FIG. 2A, the coupling member 227a couples the suspension portion 225a to the suspension portion 227b and would serve as a mounting location for the transducer 215.

In the illustrated embodiment, the transducer 215 includes a voice coil-motor. However, in other embodiments, the transducer 215 may be some other form of actuator configured to produce motion parallel to the axis 209. The transducer 215 is described in detail below with regard to FIG. 2B. Note that some portion of the transducer system 300 may be used to drive a membrane of a speaker and/or provide audio content via tissue conduction (e.g., bone conduction and/or cartilage conduction). For example, a portion of the coil assembly that is projecting above the suspension portions 225a, 225b and/or the suspension portions 225a, 225b may be used to provide vibration to a membrane for air conduction, or a material that couples vibrations to the user (e.g., for tissue conduction).

Figure 2B:
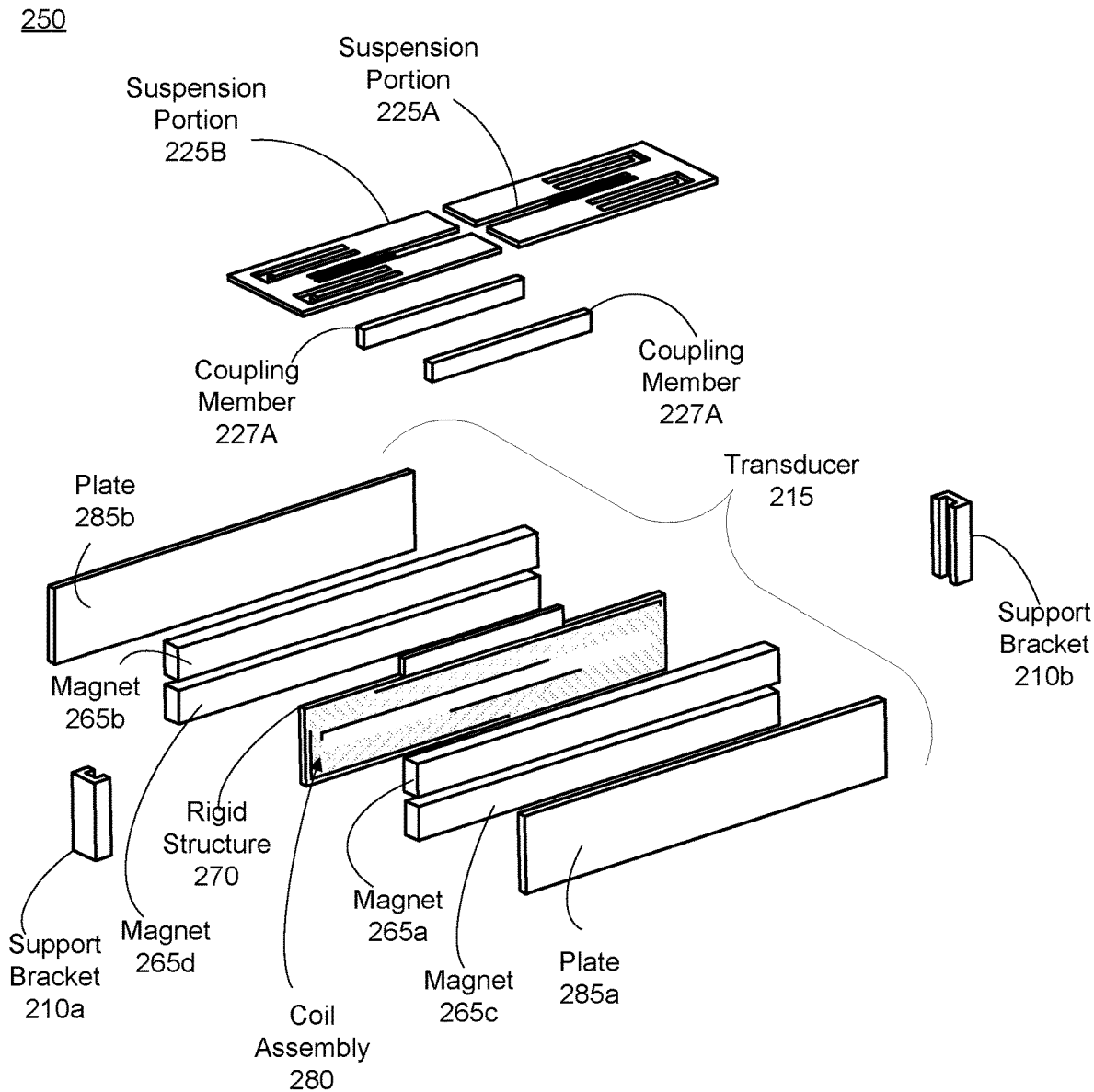
FIG. 2B is a blow-up view of the transducer system of FIG. 2A, in accordance with one or more embodiments.

FIG. 2B is a blow-up view 250 of the transducer system 200 of FIG. 2A, in accordance with one or more embodiments. In the view 250, the transducer 215 is separated out into its main components, specifically, magnets 265a, 265b, 265c, 265d, a rigid structure 270, and plates 285a, 285b. And that the transducer 215 may be divided broadly into a first sub-assembly and a second sub-assembly. The first sub-assembly includes the rigid structure 270 and the second sub-assembly includes the magnets 265a, 265b, 265c, 265d and the plates 285a, 285b.

In the illustrated embodiments, the transducer 215 includes four magnets 265a, 265b, 265c, 265d (collectively referred to as magnets 265), where two sets of magnets are arranged opposing each other, each set of magnets having an aligned polarity. For instance, magnets 265a and 265b may each be arranged with the south pole over the north pole (S/N). As such, the north pole of magnet 265a and the south pole of magnet 265b would be facing each other in an aligned polarity. In such an embodiment, magnets 265c and 265d may be arranged in the opposite fashion, with magnets 265c and 265d having the north pole over the south pole (N/S). As such, the south pole of magnet 265c and the north pole of magnet 265d would be facing each other. Any or all of these magnets may be permanent magnets. Still further, it will be recognized that although four magnets are illustrated in FIG. 2B, in other embodiments, some other number of magnets may be used. For example, two opposing magnets may be used, or six or more opposing magnets may be used in the embodiments herein.

The rigid structure 270 is arranged between the magnets. The rigid structure 270 may include one or more traces in a coil assembly 280. Note that the rigid structure 270 is coupled to the suspension portions 225a, 225b, but is not coupled to the magnets 265, and translates vertically (e.g., along axis 209), such that the rigid structure 270 is configured to act as a moveable coil. For example, the rigid structure 270 may be a printed circuit board (PCB) or other structure that is sufficiently rigid to receive forces applied thereto (e.g., Lorentz forces) and vibrate according to frequencies designated in an input signal. In some embodiments, the rigid structure 270 may have traces embedded in its structure. Or, the traces may be applied on top of the rigid structure using flexible printed circuitry (FPC) or other similar manner.

In some embodiments, the rigid structure 270 may have the coil assembly 280 deposited thereon. The coil assembly 280 may include one or more electrically conductive traces. These conductive traces may begin at a certain point and wrap around to a finishing point. As current passes through the traces according to the input signal, a Lorentz force may be generated. The Lorentz force may cause the rigid structure 270 to move on a plane that includes the axis 209.

The transducer 215 includes plates 285a, 285b (collectively referred to as plates 285) to which the magnets 265 are connected. In some embodiments, the plates 285 are soft magnets (relative to the magnets 265 which are hard magnets, i.e., has a much higher coercivity). The plates 285 may be made of steel or other structurally solid material with sufficient magnetic permeability and a sufficiently high magnetic induction saturation value. The plates 285 may include fasteners for the magnets which hold the magnets in place relative to each other. After an electrical input signal is applied to the coil assembly 280 sandwiched between the magnets 265, the rigid structure 270 may begin to move. The plates 285 hold the magnets 265 in place, so that substantially all of the Lorentz force generated may be transferred solely to the rigid structure 270. In this manner, the electrical input signal may cause motive force to be applied the rigid structure 270 in the frequencies specified in the input signal. As such, the rigid structure 270 may move relative to the magnets 265 as driven by the input signal.

Figure 3A:
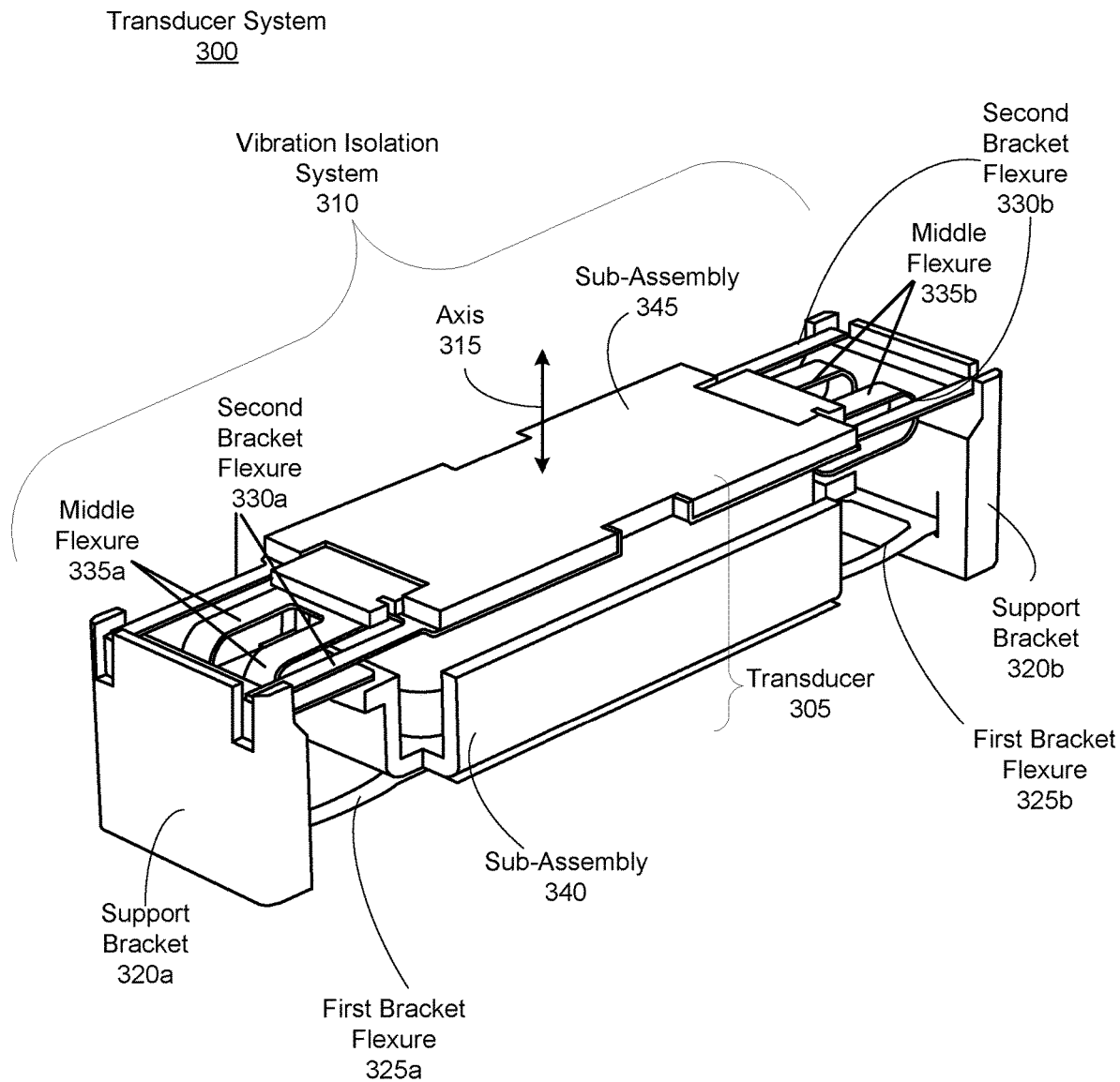
FIG. 3A is a perspective view of a transducer system, in accordance with one or more embodiments.

FIG. 3A is a perspective view of a transducer system 300, in accordance with one or more embodiments. In the embodiment of FIG. 3A, the transducer system 300 includes a transducer 305 integrated within a vibration isolation system 310. The transducer system 300 is an embodiment of the transducer system 120. As described with regard to FIG. 1, the vibration isolation system 310 isolates the vibrations produced by the transducer from a device to which the vibration isolation system 310 is attached.

In the embodiment of FIG. 3A, the transducer 305 substantially oscillates along an axis 315. The transducer 305 includes a sub-assembly 340 that includes one or more magnets and a sub-assembly 345 that includes a coil assembly.

The vibration isolation system 310 may be attached to a device (e.g., eyewear device 100) via one or more securing mechanisms, adhesives, mating interfaces, or some combination thereof. In some embodiments, the vibration isolation system 310 may be nested within a reciprocal cavity on the device. In the embodiment of FIG. 3A, the vibration isolation system 310 includes two support brackets 320a, 320b, a first bracket flexure 325a, a first bracket flexure 325b, a second bracket flexure 330a, a second bracket flexure 330b, a middle flexure 335a, and a middle flexure 335b. Note that in the illustrated embodiment the transducer system 300 is substantially symmetric with respect to an axis that bisects the support brackets 320a, 320b and is orthogonal to the axis 315.

The support brackets 320a, 320b (collectively referred to herein as "320") couple the vibration isolation system 310 to the device. The support brackets 320 are each positioned at or near an end of the vibration isolation system 310. As illustrated in FIG. 3A, the support brackets 320 are substantially centered on respective short sides of the transducer 305. In one embodiment, the support brackets 320 may be designed to receive a screw that secures a base of each support bracket 320a, 320b to the device. In one embodiment, some portion of one or both support brackets 320 includes an adhesive surface. In alternate embodiments, the shape and dimensions of each support bracket 320a, 320b may vary.

The support bracket 320a couples to the transducer 305 via the first bracket flexure 325a and the second bracket flexure 330a, and the support bracket 320b couples to the transducer 305 via the first bracket flexure 325b and the second bracket flexure 330b.

The first bracket flexures 325a, 325b (collectively referred to herein as "325") suspend a sub-assembly 340 of the transducer 305 from the support brackets 320 using a plurality of flexure segments. As illustrated, each of the first bracket flexures 325 includes two flexure segments. A flexure segment is a flexing element of a flexure of a suspension component. As illustrated only one flexure segment is visible for each of the first bracket flexures 325. In other embodiments, one or both of the first bracket flexures 325 may have some other number of flexure segments.

The second bracket flexure 330a, 330b (collectively referred to herein as "330") suspend a sub-assembly 345 of the transducer 305 from the support brackets 320. Each of the second bracket flexures 330 includes two flexure segments. For example, the second bracket flexure 330a includes two flexure segments that couple respective corners the support bracket 320a to corresponding corner of the sub-assembly 345 of the transducer 305. In other embodiments, one or both of the second bracket flexures 330 may have some other number of flexure segments.

The middle flexures 335a, 335b (collectively referred to herein as "335") couple the sub-assembly 345 of the transducer 305 to the sub-assembly 340 of the transducer 305. Each of the middle flexures 335 includes two flexure segments. For example, the middle flexure 335a includes two flexure segments that couple portions of the sub-assembly 345 of the transducer 305 to the sub-assembly 340 of the transducer 305. In other embodiments, one or both of the middle flexures 335 may have some other number of flexure segments.

Together the first bracket flexures 325, the second bracket flexures 330, and the middle flexures 335 dampen vibrations in the transducer system 300 caused by motion of the transducer 305 along the axis 315. The first bracket flexures 325, the second bracket flexures 330, and the middle flexures 335 may be formed from, e.g., aluminum, brass, copper, steel, nickel, titanium, a shape memory alloy (e.g., nitinol), alloys, plastics, other suitable types of materials, or some combination thereof. In some embodiments where a shape memory alloy is used to form some or all of the vibration isolation system 310, the shape memory alloy would be such that its superelastic properties would be used. Superelasticity can help mitigate breakage and/or strain caused by long term cycling components (e.g., flexures) of the vibration isolation system 310.

The first bracket flexures 325, the second bracket flexures 330, and the middle flexures 335 each have a specific spring constant that may be the same or different from each other. A spring constant represents how stiff a flexure is. The spring constant is measured by an amount of displacement due to a force acting on the flexure. Example units may include Newtons-per-meter (N/m). In one embodiment, one or more of the flexures may be composed of conductive material (e.g., cartridge brass) such that the one or more flexures can provide current to/from the transducer 325. In this configuration, the lead wires are housed within the transducer system in a stable and protected manner and are thus less likely to break relative to conventional lead wires, thereby increasing the robustness of the transducer system.

In the illustrated embodiment, the transducer 305 is a voice coil motor. However, in other embodiments, the transducer 305 may be some other form of actuator configured to produce motion parallel to the axis 315. The transducer includes the sub-assembly 345 and the sub-assembly 340. The transducer 305 is described in detail with regard to FIG. 3D.

The transducer system 300 in FIG. 3A is shown in a neutral position. A neutral position describes the positions of sub-assembly 345 and the sub-assembly 340 of the transducer 305 at rest and not under load (e.g., no actuation by the transducer 305). As the transducer 305 actuates, the sub-assembly 345 may move and/or the sub-assembly 340 may move along the axis 315 based in part on the actuation and the suspension forces imparted by one or more of the first bracket flexures 325, the second bracket flexures 330, and the middle flexures 335. In some embodiments, at some frequencies, the sub-assembly 345 and the sub-assembly 340 may move in the same direction at the same time along the axis 315. In some embodiments, at other frequencies, the sub-assembly 345 and the sub-assembly 340 may move in opposite directions at the same time along the axis 315. The neutral position of the transducer system 300 is one of many possible positions within a range of positions. The range of positions is bounded by a minimum position and a maximum position. The minimum position is a position describing a position where the sub-assembly 345 and the sub-assembly 340 are closer together than in the neutral position. The maximum position describes a position where the sub-assembly 345 and the sub-assembly 340 are farther apart than in the neutral position.

Each of the first bracket flexures 325, the second bracket flexures 330, and the middle flexures 335 compresses and/or extends due to the weight and/or vibrations of the transducer 305. In the embodiment of FIG. 3A, each flexure flexes in a direction along an axis 315 or parallel to the axis 315 as the transducer 305 oscillates along the axis 315. The spring constant of each flexure is pre-determined with the values of the three masses to align two of the resonances. Accordingly, resonances of the first bracket flexures 325, the second bracket flexures 330, and the middle flexures 335 offset each other such that vibrations produced by the transducer 305 are isolated within the transducer system 300. Combining the flexures and the transducer in this configuration enables the transducer system 300 to have a small form factor, such that it can be more easily introduced into consumer electronic devices than conventional suspension systems that are typically separate components from transducers.

Note that some portion of the transducer system 300 may be used to drive a membrane of a speaker and/or provide audio content via tissue conduction (e.g., bone conduction and/or cartilage conduction). For example, a portion of the sub-assembly 345 may be used to provide vibration to a membrane for air conduction, or a material that couples vibrations to the user (e.g., for tissue conduction).

Figure 3B:
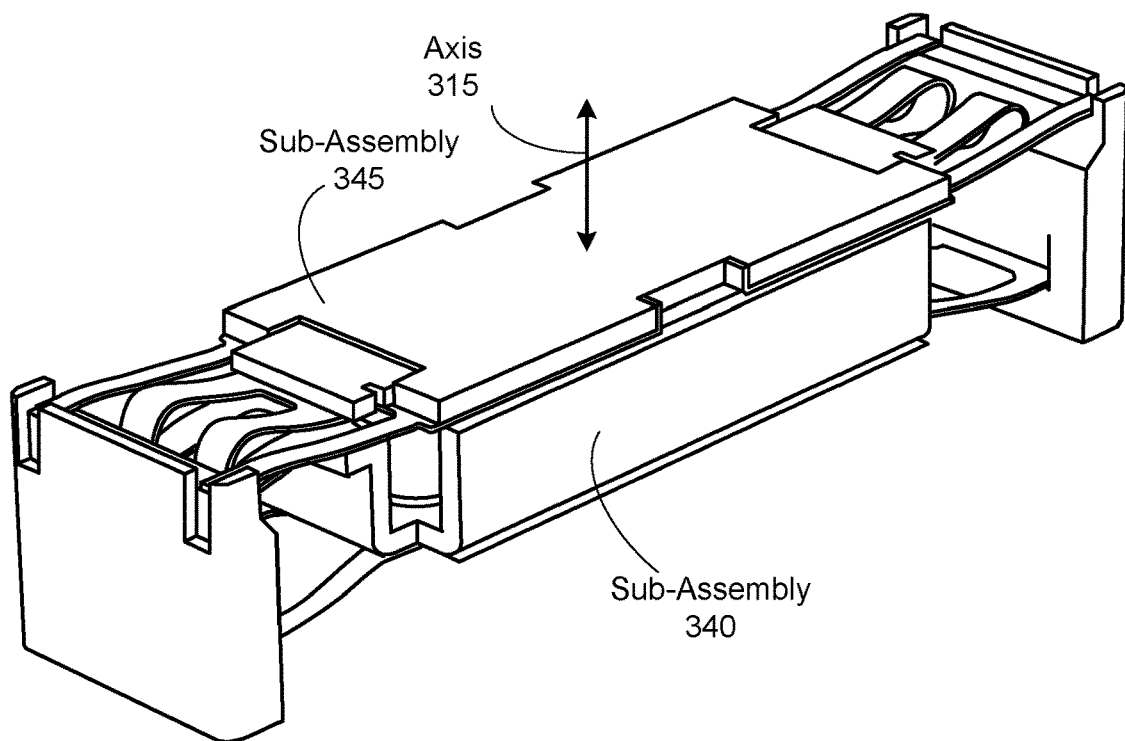
FIG. 3B is a perspective view of the transducer system of FIG. 3A in a minimum position at a particular resonance, in accordance with one or more embodiments.

FIG. 3B is a perspective view of the transducer system 300 of FIG. 3A in a minimum position of one resonance, in accordance with one or more embodiments. In the illustrated embodiment, the sub-assembly 345 and moved closer to the sub-assembly 340 along the axis 315, and the sub-assembly 340 has also moved closer to the sub-assembly 345 along the axis 315.

Figure 3C:
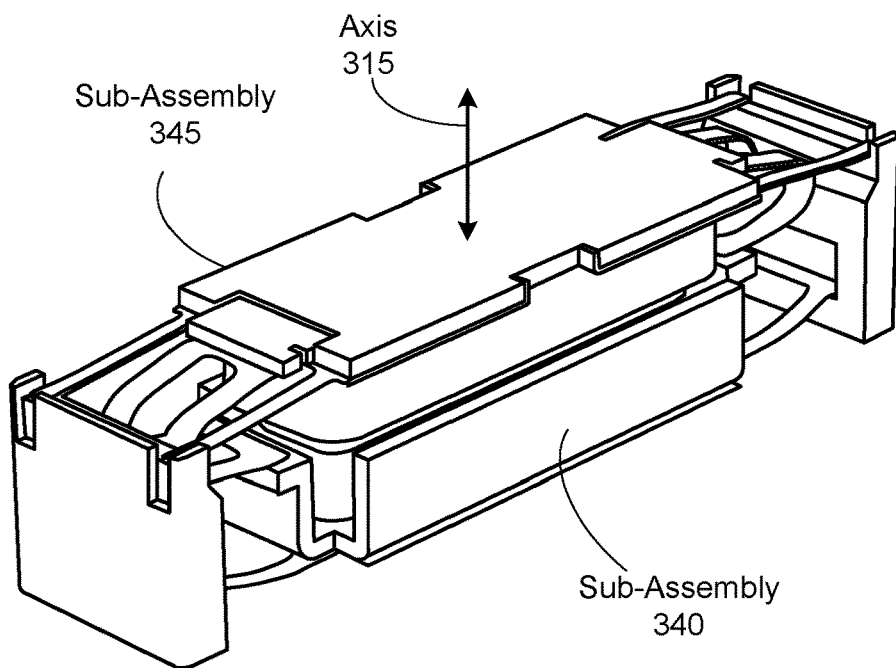
FIG. 3C is a perspective view of the transducer system of FIG. 3A in a maximum position at a particular resonance, in accordance with one or more embodiments.

FIG. 3C is a perspective view of the transducer system 300 of FIG. 3A in a maximum position of one resonance, in accordance with one or more embodiments. In the illustrated embodiment, the sub-assembly 345 and moved away from the sub-assembly 340 along the axis 315, and the sub-assembly 340 has also moved away from the sub-assembly 345 along the axis 315.

Figure 3D:
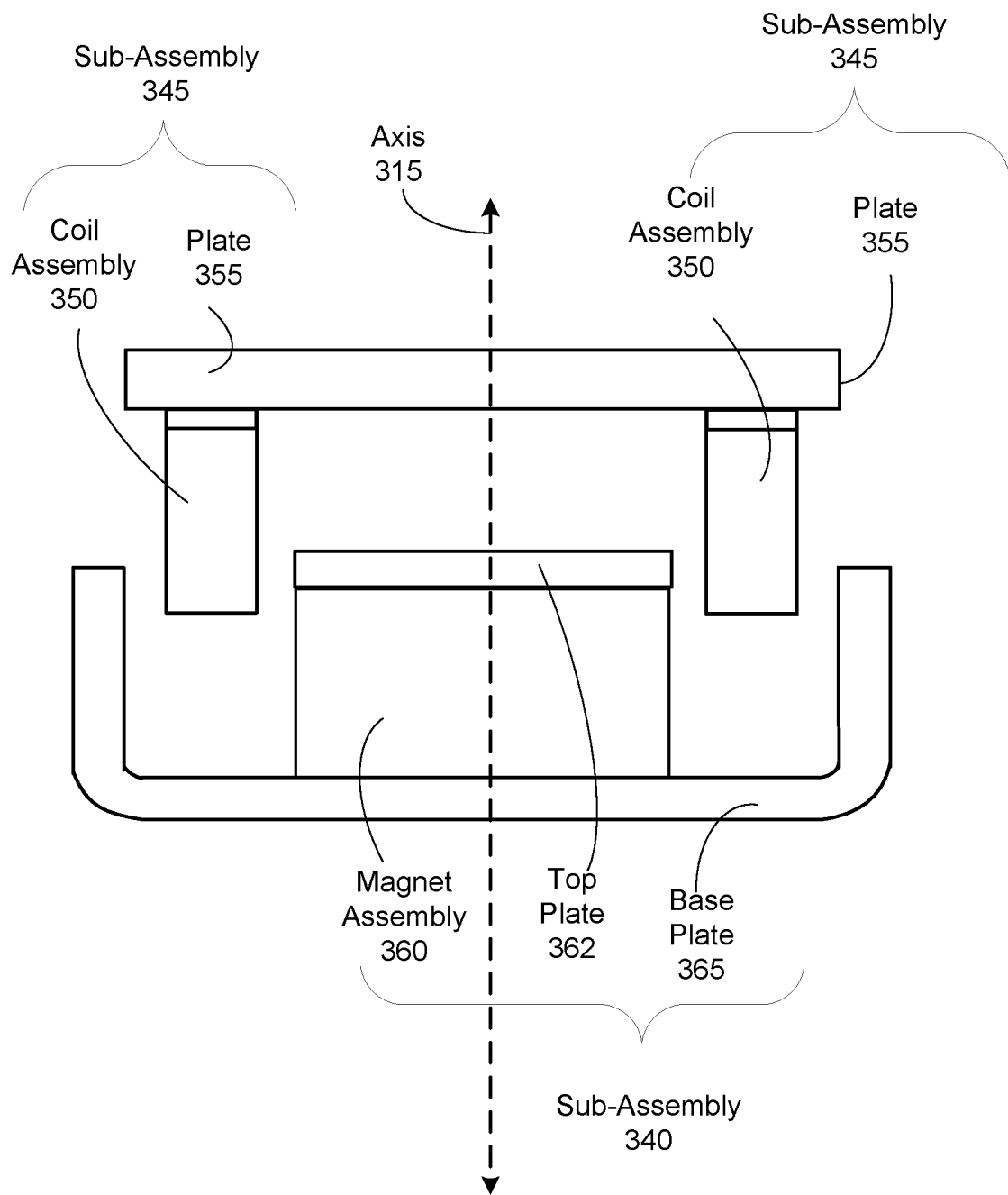
FIG. 3D is a cross section of the transducer system of FIG. 3A, in accordance with one or more embodiments.

FIG. 3D is a cross section of the transducer system 300 of FIG. 3A, in accordance with one or more embodiments. The sub-assembly 345 includes a coil assembly 350 and a plate 355. And the sub-assembly 340 includes a magnet assembly 360, top plate 362, and a base plate 365.

The magnet assembly 360 provides a magnetic field. The magnet assembly 360 includes one or more magnets that are arranged to generate a force-pair along the axis 315 responsive to a current being applied to the coil assembly 350. The magnet assembly 360 is coupled to the base plate 365. The magnet assembly 360 contributes to the efficiency of the system; in general, the larger the magnet, the greater the efficiency.

The coil assembly 350 is a coil of electrically conductive material arranged such that it may (depending on position of the transducer 305) circumscribe the magnet assembly 360. After an electrical input signal is applied to the coil assembly 350 the sub-assembly 345 and/or the sub-assembly 340 may begin to move along the axis 315. The mass of both the magnet assembly 360 and the coil assembly 350 may be tuned in addition to spring rates of the suspensions (i.e., the first bracket flexures 325, the second bracket flexures 330, middle flexures 335), but changing these components have implications for the electromagnetic efficiency of the transducer 305.

The plate 355, the top plate 362, the base plate 365, or some combination thereof, may be made of steel or other structurally solid material with sufficient magnetic permeability and a sufficiently high magnetic induction saturation value. The top plate 362 focuses magnetic flux density in the gap (e.g., through the coil assembly 350). The base plate 365 may include fasteners for one or more magnets of the magnet assembly 360 which hold the one or more magnets in place relative to each other.

Figure 4:
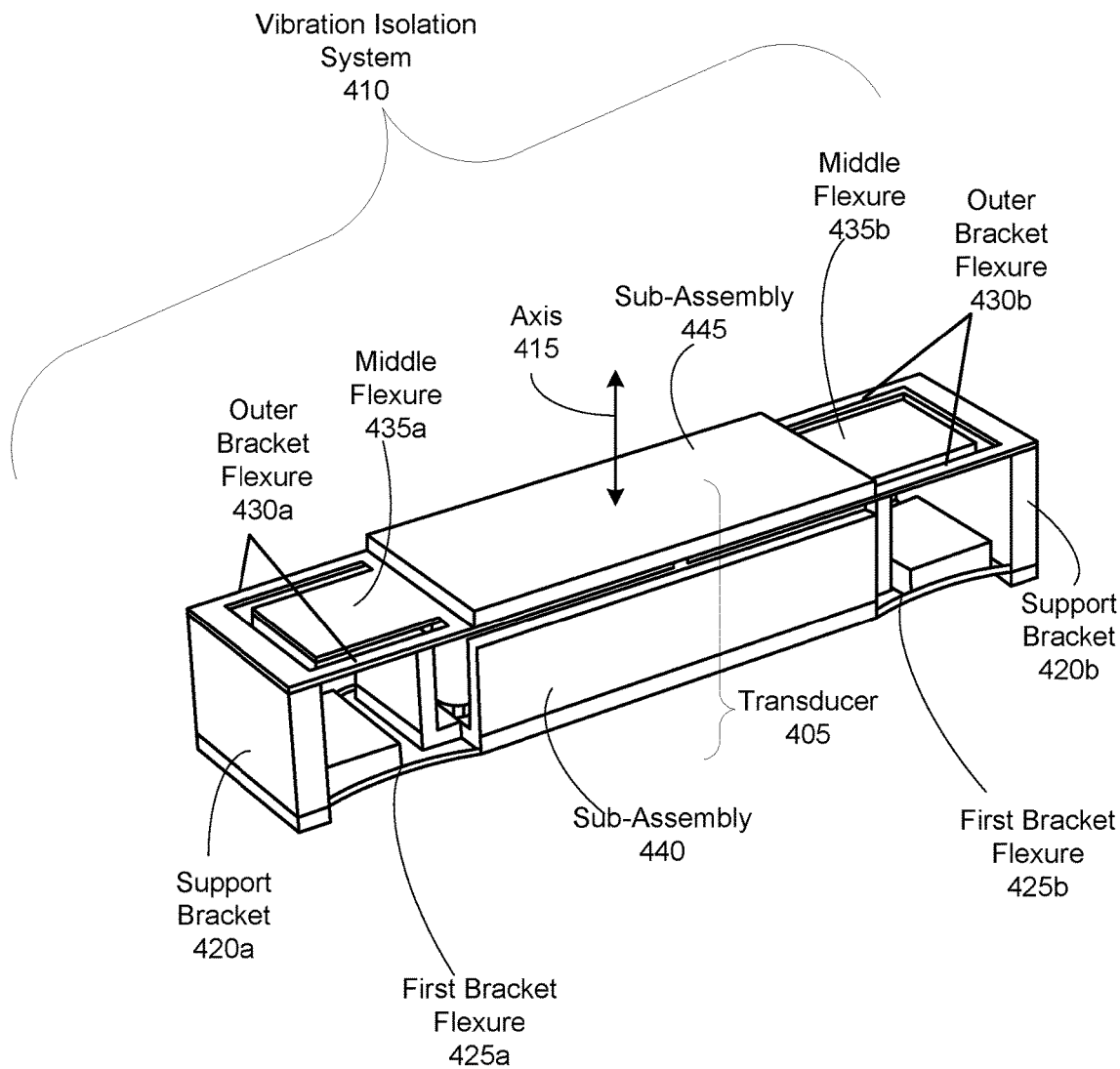
FIG. 4 is a perspective view of a transducer system, in accordance with one or more embodiments.

FIG. 4 is a perspective view of a transducer system 400, in accordance with one or more embodiments. In the embodiment of FIG. 4, the transducer system 400 includes a transducer 405 integrated within a vibration isolation system 410. The transducer 405 is substantially similar to the transducer 305. In the embodiment of FIG. 4, the transducer 405 substantially oscillates along an axis 415. The transducer 405 includes a sub-assembly 440 that includes one or more magnets and a sub-assembly 445 that includes a coil assembly.

The vibration isolation system 410 may be attached to a device (e.g., eyewear device 100) via one or more securing mechanisms, adhesives, mating interfaces, or some combination thereof. In some embodiments, the vibration isolation system 410 may be nested within a reciprocal cavity on the device. In the embodiment of FIG. 4, the vibration isolation system 410 includes two support brackets 420a, 420b, a first bracket flexure 425a, a first bracket flexure 425b, an outer bracket flexure 430a, an outer bracket flexure 430b, a middle flexure 435a, and a middle flexure 435b. Note that in the illustrated embodiment the transducer system 400 is substantially symmetric with respect to an axis that bisects the support brackets 420a, 420b and is orthogonal to the axis 415.

The support brackets 420a, 420b (collectively referred to herein as "420") couple the vibration isolation system 410 to the device. The support brackets 420 are each positioned at or near an end of the vibration isolation system 410. The support brackets 420 functionally, are substantially the same as the support brackets 320. The support bracket 420a couples to the transducer 405 via the first bracket flexure 425a and outer bracket flexure 430a, and the support bracket 420b couples to the transducer 405 via the first bracket flexure 425a and the outer bracket flexure 430b.

The first bracket flexures 425a, 425b (collectively referred to herein as "425") suspend a lower portion 440 of the transducer 405 from the support brackets 420. The first bracket flexures 425 are functionally the same as the bracket flexures 325.

The outer bracket flexure 430a and the middle flexure 435a are formed from a single suspension component. Likewise, the outer bracket flexure 430b and the middle flexure 435b are formed from a single suspension component. A single suspension component may be integrally formed of a same piece of material (rather than be individual segments).

The outer bracket flexures 430a, 430b (collectively referred to herein as "430") suspend a sub-assembly 445 of the transducer 405 from the support brackets 420. Each of the outer bracket flexures 430 includes two flexure segments. For example, the outer bracket flexure 430a includes two flexure segments that couple respective corners the support bracket 420a to corresponding corners of the sub-assembly 445 of the transducer 405. In other embodiments, one or both of the outer bracket flexures 430 may have some other number of flexure segments.

The middle flexures 435a, 435b (collectively referred to herein as "435") couple the sub-assembly 445 of the transducer 405 to the lower portion 440 of the transducer 405. Each of the middle flexures 435 includes a single flexure segment. For example, the middle flexure 435a includes a single flexure segment that couple portions of the sub-assembly 445 of the transducer 405 to the lower portion 440 of the transducer 405. In other embodiments, one or both of the middle flexures 435 may have some other number of flexure segments.

The first bracket flexures 425, the outer bracket flexures 430, and the middle flexures 435 each have a specific spring constant that may be the same or different from each other. Together the first bracket flexures 425, the outer bracket flexures 430, and the middle flexures 435 dampen vibrations in the transducer system 400 caused by motion of the transducer 405 along the axis 415. The first bracket flexures 425, the outer bracket flexures 430, and the middle flexures 435 may be formed from, e.g., aluminum, brass, copper, steel, nickel, titanium, a shape memory alloy (e.g., nitinol), alloys, other suitable types of materials, or some combination thereof. In one embodiment, one or more flexures (e.g., the first bracket flexures 425, the outer bracket flexures 430, and the middle flexures 435) may be composed of conductive material (e.g., cartridge brass) such that the one or more flexures can provide current to/from the transducer 425. In some embodiments, some portions of the one or more flexures and/or other flexures are also electrically insulated. In some embodiments where a shape memory alloy is used to form some or all of the vibration isolation system 410, the shape memory alloy would be such that its superelastic properties would be used. Superelasticity can help mitigate breakage and/or strain caused by long term cycling components (e.g., flexures) of the vibration isolation system 410.

Each of the first bracket flexures 425, the outer bracket flexures 430, and the middle flexures 435 compresses and/or extends due to the weight and/or vibrations of the transducer 405. In the embodiment of FIG. 4, each of the first bracket flexures 425, the outer bracket flexures 430, and the middle flexures 435 flexes in a direction along an axis 415 or parallel to the axis 415 as the transducer 405 oscillates along the axis 415. The spring constant of each of the first bracket flexures 425, the outer bracket flexures 430, and the middle flexures 435 is pre-determined with the values of the three masses to align two of the resonances. Accordingly, resonances of the first bracket flexures 425, the outer bracket flexures 430, and the middle flexures 435 offset each other such that vibrations produced by the transducer 405 are isolated within the transducer system 400.

Note that some portion of the transducer system 400 may be used to drive a membrane of a speaker and/or provide audio content via tissue conduction (e.g., bone conduction and/or cartilage conduction). For example, a portion of the sub-assembly 445 may be used to provide vibration to a membrane for air conduction, or a material that couples vibrations to the user (e.g., for tissue conduction).

Figure 5A:
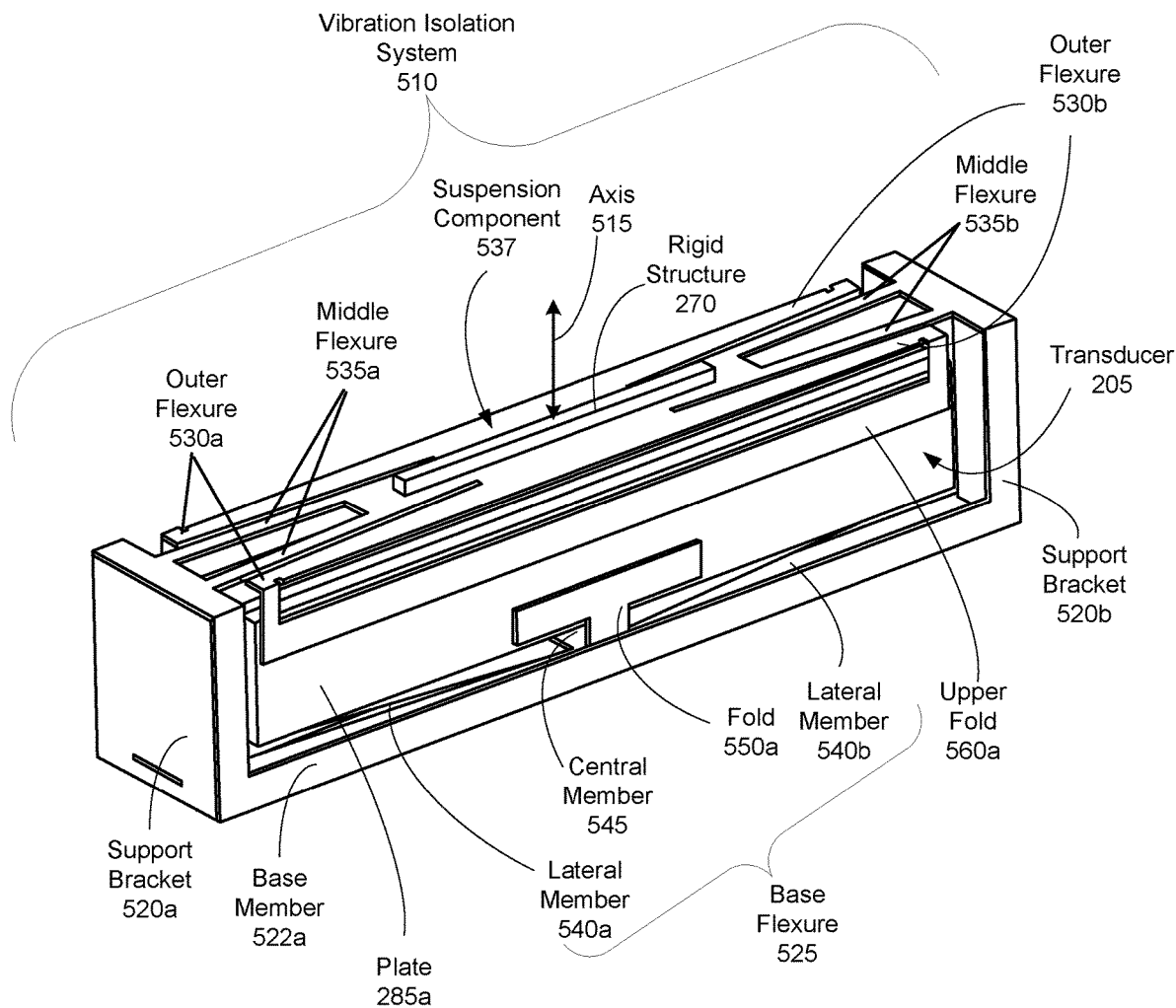
FIG. 5A is a perspective view of a transducer system, in accordance with one or more embodiments.

FIG. 5A is a perspective view of a transducer system 500, in accordance with one or more embodiments. In the embodiment of FIG. 5A, the transducer system 500 includes the transducer 215 integrated within a vibration isolation system 510. In the embodiment of FIG. 5A, the transducer 215 substantially oscillates along an axis 515. The vibration isolation system 510 may be attached to a device (e.g., eyewear device 100) via one or more securing mechanisms, adhesives, mating interfaces, or some combination thereof.

In some embodiments, the transducer system 500 may be nested within a reciprocal cavity on the device. In the embodiment of FIG. 5A, the vibration isolation system 510 includes two support brackets 520a, 520b, a base flexure 525, an outer flexure 530a, an outer flexure 530b, a middle flexure 535a, and a middle flexure 535b. Note that in the illustrated embodiment the transducer system 500 is substantially symmetric with respect to an axis that bisects the support brackets 520a, 520b and is orthogonal to the axis 515.

The support brackets 520a, 520b (collectively referred to herein as "520") couple the vibration isolation system 510 to the device. The support brackets 520 are each positioned at or near an end of the vibration isolation system 510. The support brackets 520 functionally, are substantially similar to the support brackets 320. The support brackets 520 are coupled via a base member 522a and a base member 522b (collectively referred to as 522). Note that the base member 522b is not shown in FIG. 5A, but is shown in FIG. 5D. And each base member 522a, 522b couples to corresponding corners of the support bracket 520a and the support bracket 520b. The support bracket 520a is coupled to and suspends the transducer 215 via the base flexure 525 and the middle flexure 535a, and the support bracket 520b is coupled to and suspends the transducer 215 via the base flexure 525 and the middle flexure 535b.

Note as illustrated the middle flexures 535a, 535b (collectively 535) and the outer flexures 530a, 530b (collectively 530) are part of a single suspension component 537. The suspension component 537 is formed from a single monolithic piece of material that has been cut and shaped to form a single suspension component that includes the middle flexures 535, the outer flexures 530 and upper folds (e.g., an upper fold 560a). Additionally, note that the single piece of material also is used to form the base members 522. The material may be, e.g., aluminum, brass, copper, steel, nickel, titanium, a shape memory alloy (e.g., nitinol), alloys, other suitable types of materials, or some combination thereof. The suspension component 537 may be connected to and/or coupled to the support brackets 520 via adhesive, screws, welds, mechanical means, etc. In some embodiments where a shape memory alloy is used to form some or all of the vibration isolation system 510, the shape memory alloy would be such that its superelastic properties would be used. Superelasticity can help mitigate breakage and/or strain caused by long term cycling components (e.g., flexures) of the vibration isolation system 510.

The base flexure 525 suspend plates 285a, 285b of the transducer 215 from the support brackets 520. The base flexure 525 includes one or more lateral members 540a, one or more lateral members 540b, a central member 545 and at least two folds. The one or more lateral members 540a couple the support bracket 520a to the central member 545, and the one or more lateral members 540b couple the support bracket 520b to the central member 545. The central member 545 is coupled to a fold 550a and a corresponding fold 550b on the non-visible side of the transducer 215 in FIG. 5A. Collectively the folds 550a, 550b are referred to as the folds 550. The folds 550 may be attached to the plates 285a, 285b of the transducer 215. For example, the fold 550a may be attached to the plate 285a. Note that in some embodiments, the base flexure 525 is formed from a single monolithic piece of material that has been cut and shaped to function as the base flexure 525. In other embodiments, some or all of the base flexure 525 is formed of discrete pieces that have are coupled together. For example, the folds 550 may cut from on piece of material and are coupled (e.g., glued or welded) to the central member 545 which was cut from a different piece of material (could be the same type or different type of material). Some or all of the base flexure 525 may be formed from, e.g., aluminum, brass, copper, steel, nickel, titanium, a shape memory alloy (e.g., nitinol), alloys, plastics, other suitable types of materials, or some combination thereof.

The outer flexures 530a and the outer flexure 530b (collectively the outer flexures 530) suspend the plates 285a, 285b. The outer flexures 530a and the outer flexures 530b are also joined together via an upper fold along each plate of the transducer 215. For example, as illustrated the upper fold 560a joins the outer flexures 530a to the outer flexure 530b along the plate 285a, and there is a corresponding upper fold 560b that joins the outer flexures 530 along the non-visible plate 285b on the other side of the transducer 215. The upper folds 560 are coupled (and in some cases attached) to the plates 285a, 285b via, e.g., adhesive, screws, welds, mechanical means, etc. For example, the upper fold 560a is coupled (and in some cases attached) to the plate 285a.

The middle flexure 535a and the middle flexure 535b (collectively middle flexures 535) suspend a rigid structure 270 of the transducer 215 from the support brackets 520. In the illustrated embodiment each of the middle flexures 535 includes two members which run on either side of a cutout. In other embodiments, one or both of the middle flexures 535 may have more or less members, and the size, shape, number, or some combination thereof, of the cutouts may be different.

The base flexure 525, the outer flexures 530, and the middle flexures 535 each have specific spring constants that may be the same or different from each other. Together the base flexure 525, the outer flexures 530, and the middle flexures 535 dampen vibrations in the transducer system 500 caused by motion of the transducer 215 along the axis 515. In one embodiment, one or more flexures (e.g., the base flexure 525, the outer flexures 530, and/or the middle flexures 535) may be composed of conductive material (e.g., cartridge brass) such that one or more flexures can provide current to/from the transducer 215. In some embodiments, some portions of the one or more flexures and/or other flexures are also electrically insulated.

Each of the base flexure 525, the outer flexures 530, and the middle flexures 535 compresses and/or extends due to the weight and/or vibrations of the transducer 215. In the embodiment of FIG. 5A, each of the base flexure 525, the outer flexures 530, and the middle flexures 535 flexes in a direction along an axis 515 or parallel to the axis 515 as the transducer 215 oscillates along the axis 515. The spring constant of each of the base flexure 525, the outer flexures 530, and the middle flexures 535 is pre-determined with the values of the three masses to align two of the resonances. Accordingly, resonances of the base flexure 525, the outer flexures 530, and the middle flexures 535 offset each other such that vibrations produced by the transducer 215 are isolated within the transducer system 500.

The transducer system 500 in FIG. 5A is shown in a neutral position. A neutral position for describes the position of the base flexure 525, the outer flexures 530, and the middle flexures 535, and the transducer 215 at rest and not under load (e.g., no actuation by the transducer 215). As the transducer 215 actuates, the rigid structure 570 may move relative to the plates coupled to the magnets along the axis 515, thereby increasing or decreasing flexure in one or more of the base flexure 525, the outer flexures 530, and the middle flexures 535. The neutral position of the transducer system 500 is one of many possible positions within a range of positions. The range of positions is bounded by a lower boundary position and an upper boundary position. The lower boundary position occurs when the coil assembly has displaced a maximum negative distance (i.e., direction towards the central member 545), and the upper boundary position occurs when the coil assembly has displaced a maximum positive distance (i.e., direction away the central member 545).

Note that some portion of the transducer system 500 may be used to drive a membrane of a speaker and/or provide audio content via tissue conduction (e.g., bone conduction and/or cartilage conduction). For example, a portion of the rigid structure 270 and/or the suspension component 537 may be used to provide vibration to a membrane for air conduction, or a material that couples vibrations to the user (e.g., for tissue conduction).

Figure 5B:
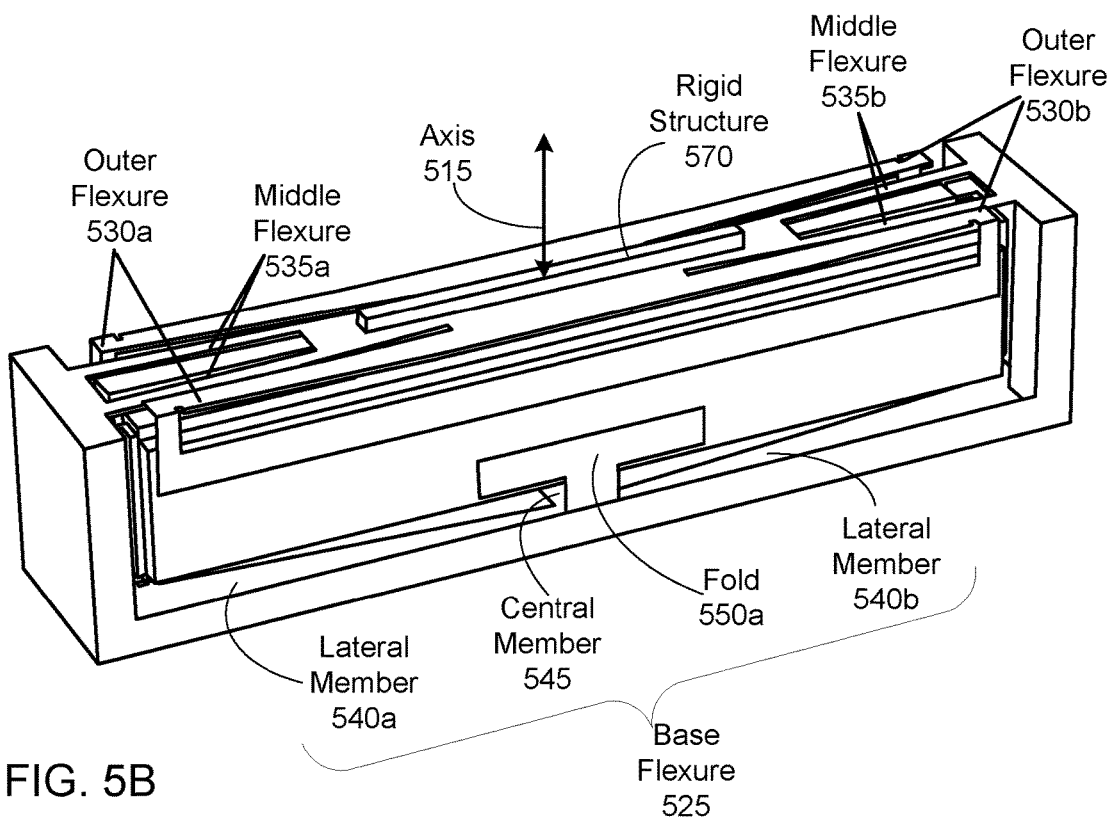
FIG. 5B is a perspective view of the transducer system of FIG. 5A in a lower boundary position at a particular resonance, in accordance with one or more embodiments.

FIG. 5B is a perspective view of the transducer system 500 of FIG. 5A in a lower boundary position at a particular resonance, in accordance with one or more embodiments. In the illustrated embodiment, the coil assembly has moved in a negative direction along the axis 515. Note the relative changes in the base flexure 525, the outer flexures 530, and the middle flexures 535 due to the change in position of the components of the transducer 215. And relative to the transducer system 500 in the neutral position, at least a portion of the outer flexures 530 is above the middle flexures 535, and portions of the base flexure 525 have flexed such that the central member 545 has moved in a positive direction along the axis 515.

Figure 5C:
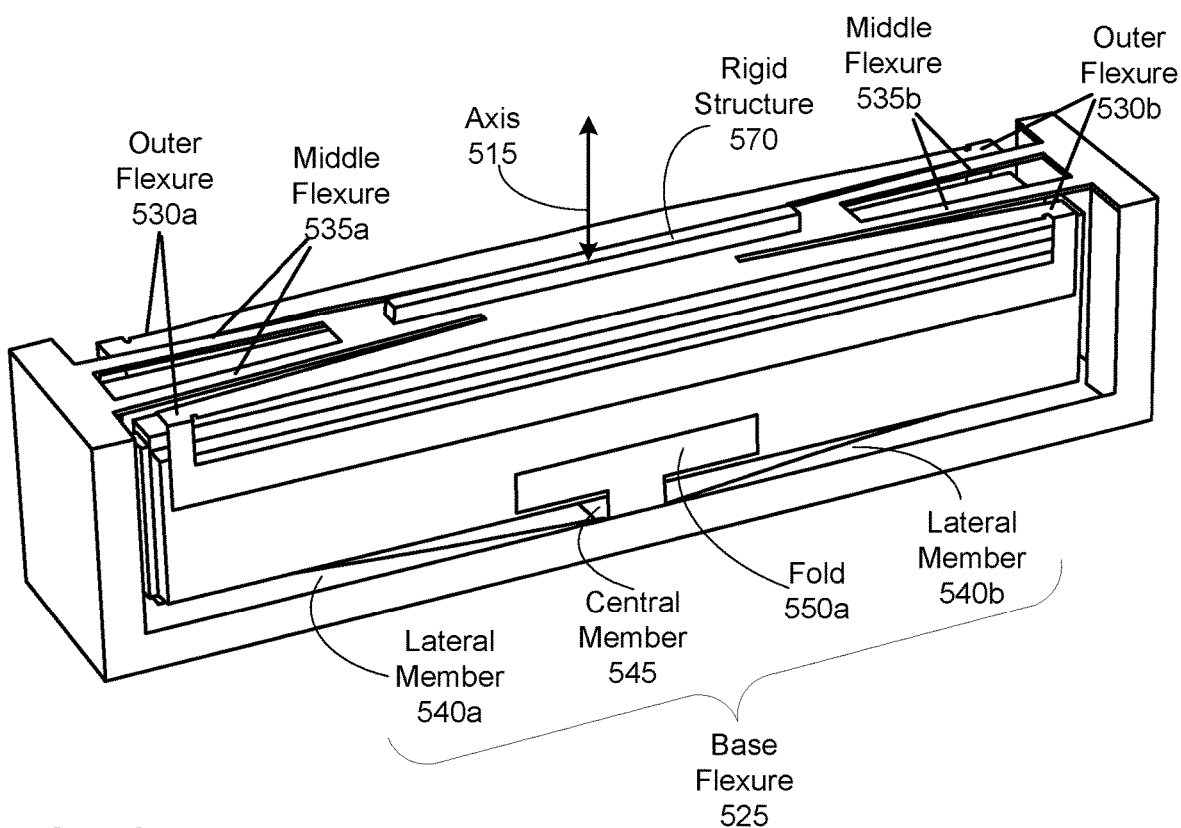
FIG. 5C is a perspective view of the transducer system of FIG. 5A in an upper boundary position at a particular resonance, in accordance with one or more embodiments.
Figure 5D:
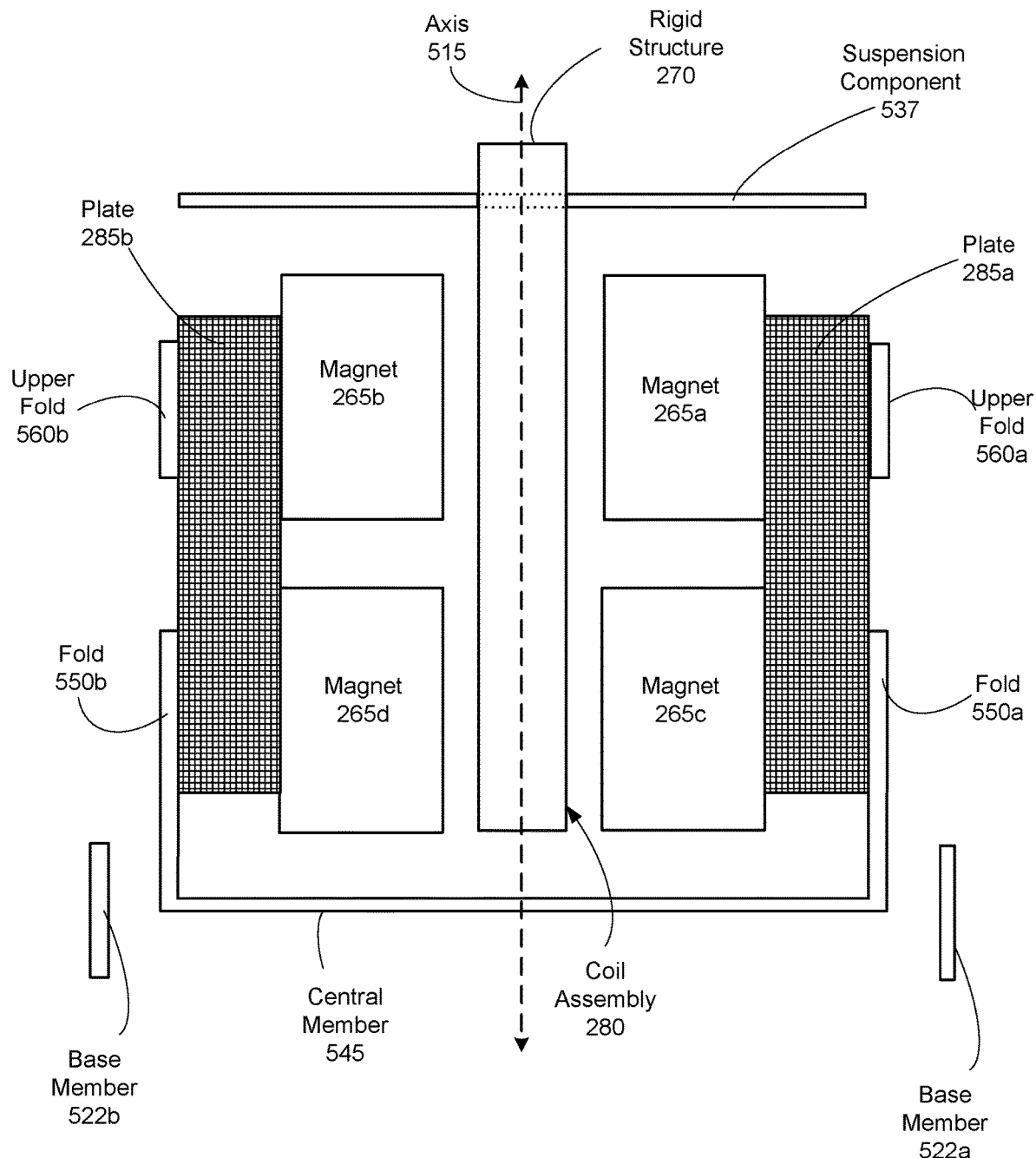
FIG. 5D is a cross section of the transducer system of FIG. 5A, in accordance with one or more embodiments.

FIG. 5C is a perspective view of the transducer system 500 of FIG. 5A in an upper boundary position at a particular resonance, in accordance with one or more embodiments. In the illustrated embodiment, the coil assembly has moved in a positive direction along the axis 515. Note the relative changes in the base flexure 525, the outer flexures 530, and the middle flexures 535 due to the change in position of the components of the transducer 215. And relative to the transducer system 500 in the neutral position, at least a portion of the outer flexures 530 is below the middle flexures 535, and portions of the base flexure 525 have flexed such that the central member 545 has moved in a negative direction along the axis 515.

FIG. 5D is a cross section of the transducer system 500 of FIG. 5A, in accordance with one or more embodiments. As described above with regard to FIG. 2B, the transducer 215 includes at least magnets 265a, 265b, 265c, 265d, a rigid structure 270, and plates 285a, 285b. Note in this view both of the upper folds 560a and 560b, both of the folds 550a and 550b, and the base members 522a and 522b are shown. As described above with regard to FIG. 2B, a first sub-assembly includes the rigid structure 270 and the coil assembly 280, and the first sub-assembly moves relative to a second sub-assembly that includes the magnets 265a, 265b, 265c, 265d and the plates 285a, 285b.

The first portion of the transducers 215 is coupled to the vibration isolation system via the upper folds 560 of the outer flexures 530 and the folds 550 of the base flexure 522. And the rigid structure 270 is suspended from the support brackets 520 via the middle flexures 535 (not shown) of the suspension component 537.

The first portion of the transducer 215 moves independent from the rigid structure 270 (that includes the coil assembly 280) along the axis 515 or an axis parallel to the axis 515. Note that the first portion may move in a same direction or in an opposite direction as the rigid structure 270. The base members 522a are coupled to the support brackets 520 and are static.

Figure 6A:
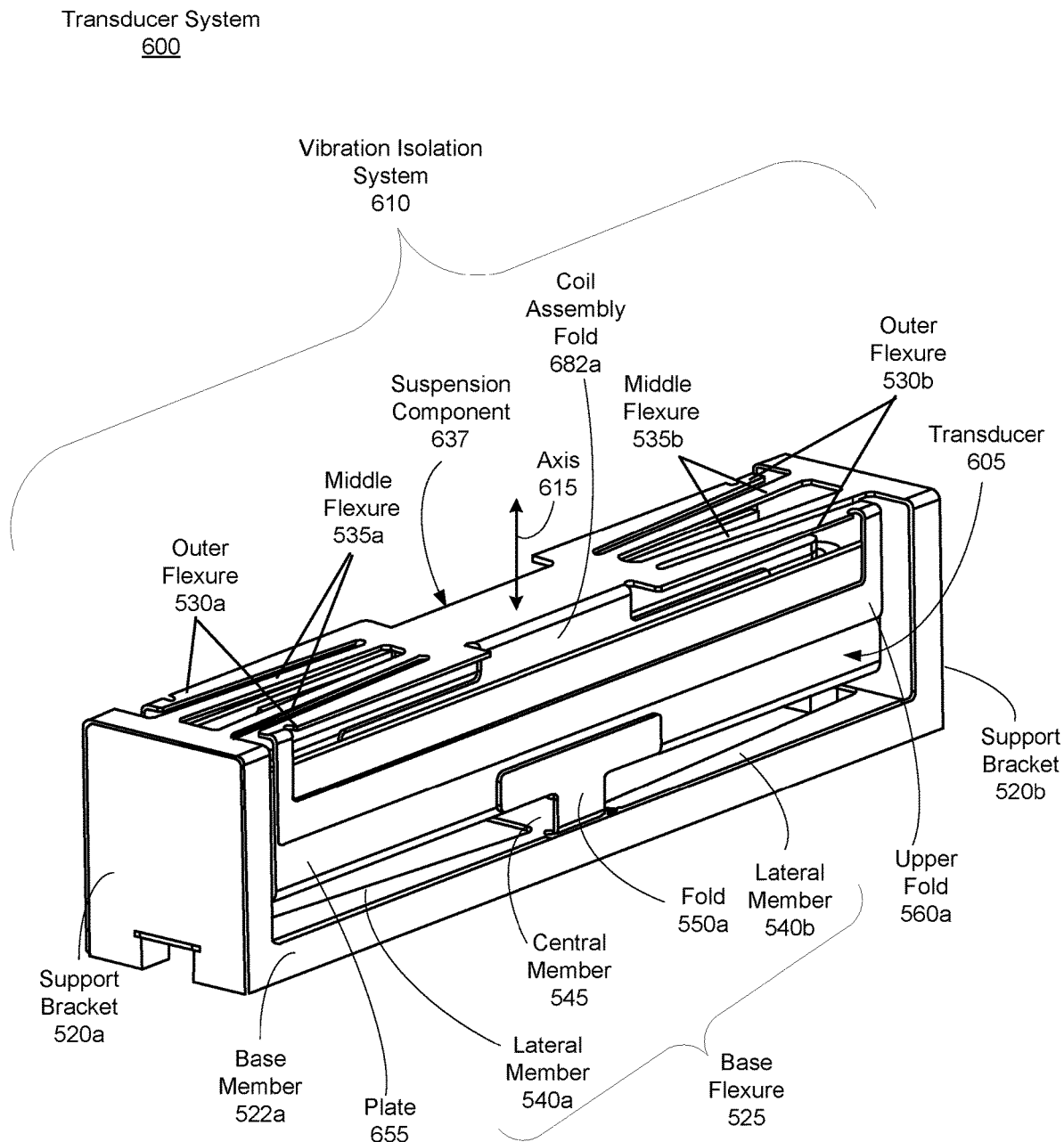
FIG. 6A is a perspective view of a transducer system, in accordance with one or more embodiments.

FIG. 6A is a perspective view of a transducer system 600, in accordance with one or more embodiments. In the embodiment of FIG. 6A, the transducer system 600 includes a transducer 605 integrated within a vibration isolation system 610. In the embodiment of FIG. 6A, the transducer 605 substantially oscillates along an axis 615. The vibration isolation system 610 may be attached to a device (e.g., eyewear device 100) via one or more securing mechanisms, adhesives, mating interfaces, or some combination thereof. In some embodiments, the transducer system 600 may be nested within a reciprocal cavity on the device.

Note that the transducer system 600 is substantially the same as the transducer system 500 except that it uses a modified vibration isolation system 610 and a different transducer 605. The vibration isolation system 610 is substantially the same as the vibration isolation system 510 except how the suspension component 637 couples to the transducer 605. In FIG. 5A, the suspension component 537 coupled to the rigid structure 270. In contrast, in FIG. 6A, the transducer 605 is structured similar to that of transducer 305 (magnets centrally located instead of on the periphery) and the suspension component 637 includes a coil assembly folds 682a and a coil assembly fold 682b (collectively referred to as coil assembly folds 682) that couple to a coil assembly of the transducer 605.

Note as illustrated the middle flexures 535, the outer flexures 530, and the coil assembly folds 682 are part of a single suspension component 637. The suspension component 637 is formed from a single monolithic piece of material that has been cut and shaped to form a single suspension component that includes the middle flexures 535, the outer flexures 530, the upper folds 560, and the coil assembly folds 682. Additionally, note that the single piece of material of the suspension component 637 also forms the base members 522. The material may be, e.g., aluminum, brass, copper, steel, nickel, titanium, a shape memory alloy (e.g., nitinol), alloys, plastics, other suitable types of materials, or some combination thereof. The suspension component 637 may be connected to and/or coupled to the support brackets 520 via adhesive, screws, welds, mechanical means, etc.

The outer flexures 530a and the outer flexure 530b (collectively the outer flexures 530) suspend a plate 655 of the transducer 605. The outer flexures 530a and the outer flexures 530b are also joined together via an upper fold 560. The upper folds 560 are coupled (and in some cases attached) to the plate 655 via, e.g., adhesive, screws, welds, mechanical means, etc. For example, the upper fold 560a is coupled (and in some cases attached) to the plate 655. Plate 655 is substantially similar to plate 285 in FIG. 5D, in that they serve a same functional purpose (e.g., provide a high-permeability, high-saturation flux return path around the hard magnets), however they are implemented in different manners.

The transducer system 600 in FIG. 6A is shown in a neutral position. A neutral position for describes the position of the base flexure 525, the outer flexures 530, and the middle flexures 535, and the transducer 605 at rest and not under load (e.g., no actuation by the transducer 605). As the transducer 605 actuates, the coil assembly folds 682 (coupled to the coil assembly) may move relative to the plate 685 (coupled to the magnets) along the axis 615, thereby increasing or decreasing flexure in one or more of the base flexure 525, the outer flexures 530, and the middle flexures 535.

Note that some portion of the transducer system 600 may be used to drive a membrane of a speaker and/or provide audio content via tissue conduction (e.g., bone conduction and/or cartilage conduction). For example, a portion of the suspension component 637 may be used to provide vibration to a membrane for air conduction, or a material that couples vibrations to the user (e.g., for tissue conduction).

Figure 6B:
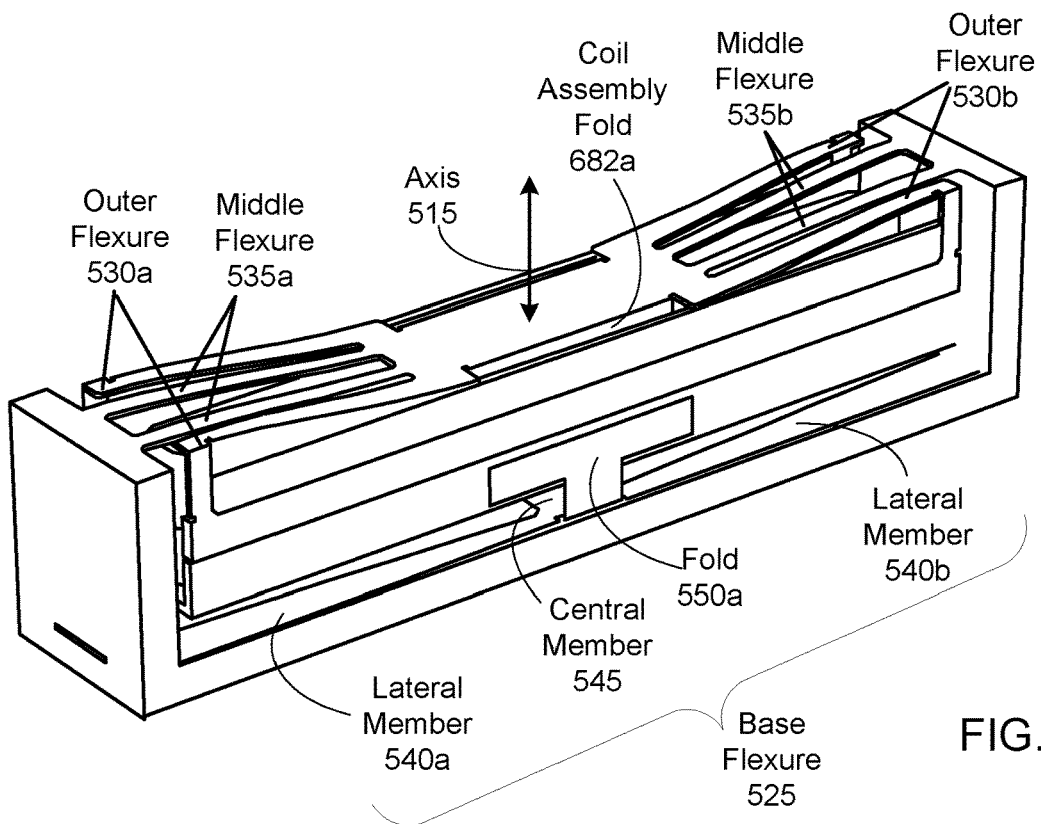
FIG. 6B is a perspective view of the transducer system of FIG. 6A in a lower boundary position at a particular resonance, in accordance with one or more embodiments.

FIG. 6B is a perspective view of the transducer system 600 of FIG. 6A in a lower boundary position at a particular resonance, in accordance with one or more embodiments. In the illustrated embodiment, the coil assembly has moved in a negative direction along the axis 615. Note the relative changes in the base flexure 525, the outer flexures 530, and the middle flexures 535 due to the change in position of the components of the transducer 605. And relative to the transducer system 600 in the neutral position, at least a portion of the outer flexures 530 is above the middle flexures 535, and portions of the base flexure 525 have flexed such that the central member 545 has moved in a positive direction along the axis 615.

Figure 6C:
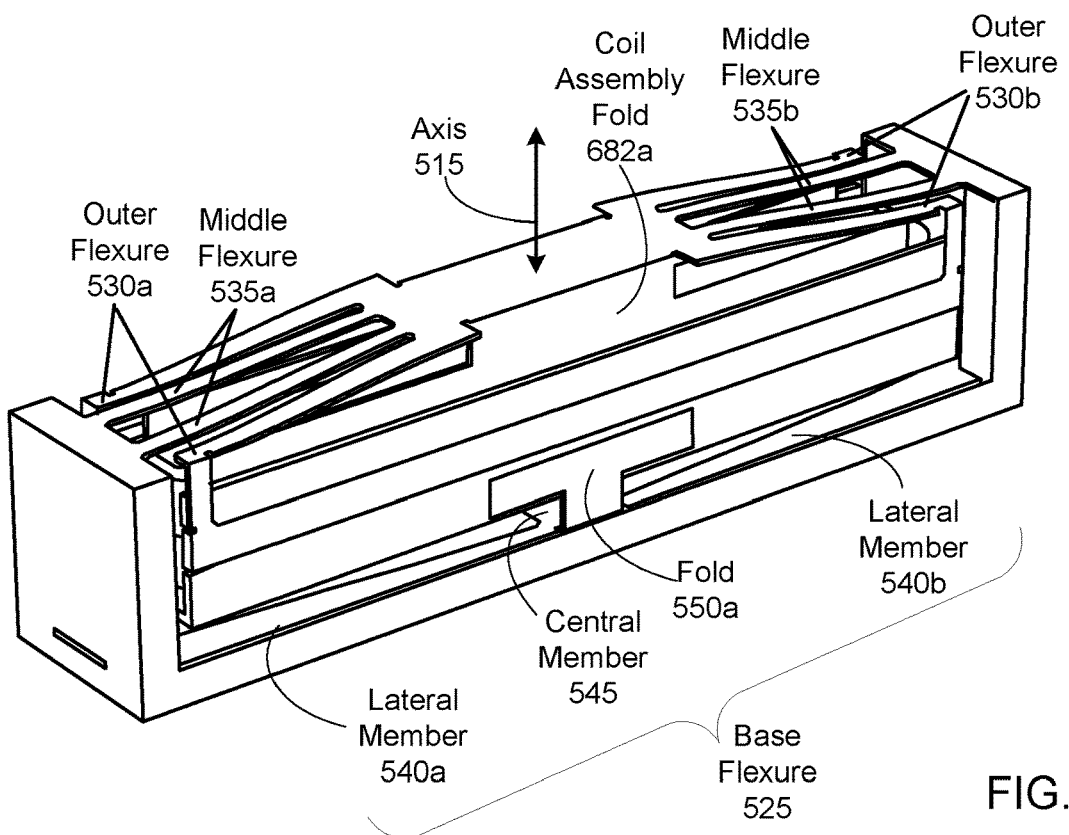
FIG. 6C is a perspective view of the transducer system of FIG. 6A in an upper boundary position at a particular resonance, in accordance with one or more embodiments.

FIG. 6C is a perspective view of the transducer system 600 of FIG. 6A in an upper boundary position at a particular resonance, in accordance with one or more embodiments. In the illustrated embodiment, the coil assembly has moved in a positive direction along the axis 615. Note the relative changes in the base flexure 525, the outer flexures 530, and the middle flexures 535 due to the change in position of the components of the transducer 605. And relative to the transducer system 600 in the neutral position, at least a portion of the outer flexures 530 is below the middle flexures 535, and portions of the base flexure 525 have flexed such that the central member 545 has moved in a negative direction along the axis 615.

Figure 6D:
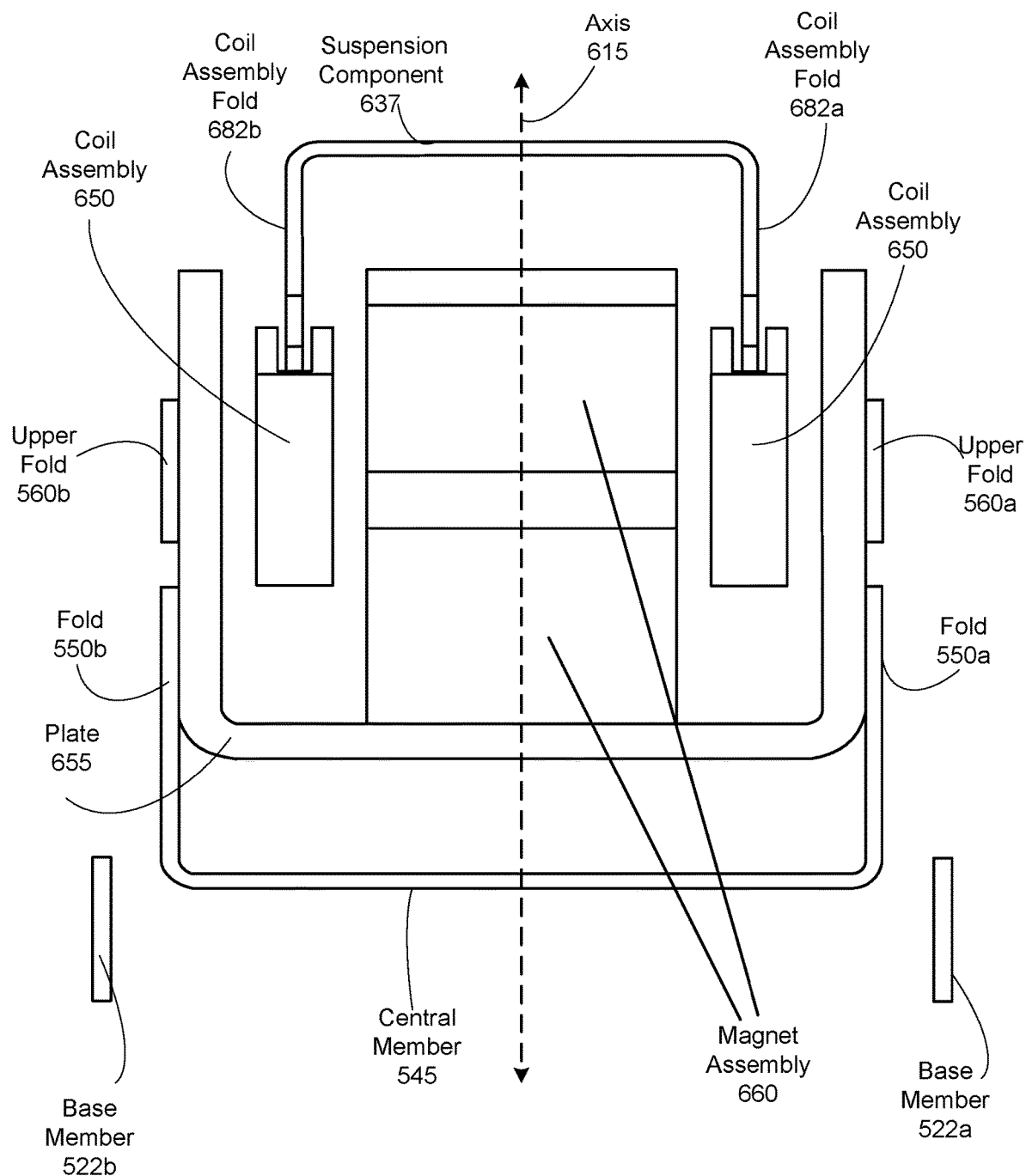
FIG. 6D is a cross section of the transducer system of FIG. 6A, in accordance with one or more embodiments.

FIG. 6D is a cross section of the transducer system 600 of FIG. 6A, in accordance with one or more embodiments. A first sub-assembly includes a coil assembly 650 and the first sub-assembly moves relative to a second sub-assembly that includes a magnet assembly 660 and the plate 655.

The magnet assembly 660 provides a magnetic field. The magnet assembly 660 includes one or more magnets that are arranged to cause a translation along the axis 615 responsive to a current being applied to the coil assembly 650. The magnet assembly 660 is coupled to the plate 655. The magnet assembly 660 contributes to the efficiency of the system; in general, the larger the magnet, the greater the efficiency.

The coil assembly 650 is a coil of electrically conductive material arranged such that it may (depending on position of the transducer 605) circumscribe the magnet assembly 660. The coil assembly 650 is coupled to a portion of the suspension component 637 via the coil assembly folds 682a, 682b (collective referred to herein as 682). After an electrical input signal is applied to the coil assembly 650 the first sub-assembly and/or the second sub-assembly may begin to move along the axis 615. The mass of both the magnet assembly 660 and the coil assembly 650 may be tuned in addition to spring rates of the suspensions (e.g., the outer flexures 530, the middle flexures 535 and the base flexure 525), but changing these components have implications for the electromagnetic efficiency of the transducer 305

The plate 655 may be made of steel or other structurally solid material with sufficient magnetic permeability and a sufficiently high magnetic induction saturation value. The plate 655 may include fasteners for one or more magnets of the magnet assembly 660 which hold the one or more magnets in place relative to each other.

The first sub-assembly of the transducer 605 is coupled to the vibration isolation system 610 via the upper folds 560 of the outer flexures 530 and the middle flexures 535 which suspend the first sub-assembly from the support brackets 520. The second sub-assembly is coupled to the vibration isolation system via the folds 550 of the base flexure 525.

The second sub-assembly of the transducer 605 moves independent from the first sub-assembly (that includes the coil assembly 650) along the axis 615 or an axis parallel to the axis 615. Note that the second sub-assembly may move in a same direction or in an opposite direction as the first sub-assembly. The base members 522a are coupled to the support brackets 520 and are static.

Figure 7B:
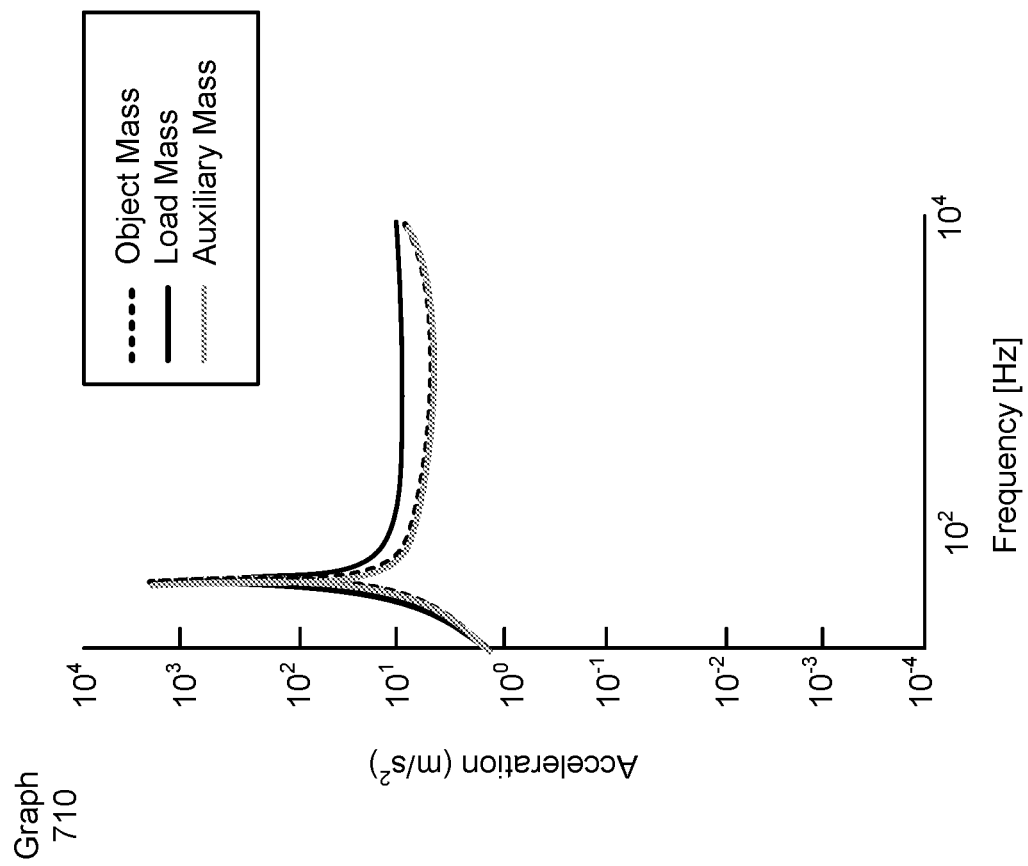
FIG. 7B illustrates an acceleration versus frequency graph for the one-DOF vibration system of FIG. 7A, in accordance with one or more embodiments.

Turning now to a discussion to help illustrate how vibration isolation system disclosed herein mitigate vibration of transducers, FIGS. 7A-7J below discuss various vibration systems. Note that the vibration systems shown in FIGS. 7A, 7C, 7E, 7G have specific issues which are addressed by the embodiment shown and described by FIGS. 7I and 7J. And the principles of the vibration system shown and described by FIGS. 7I and 7J are what the vibration isolations systems described above are based on.

Figure 7A:
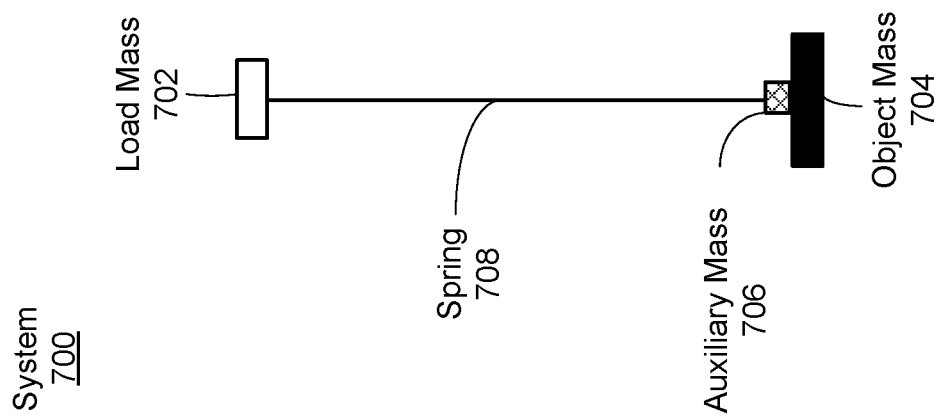
FIG. 7A illustrates a theoretical one-DOF vibration system without any vibration isolation features, in accordance with one or more embodiments.
Figure 7D:
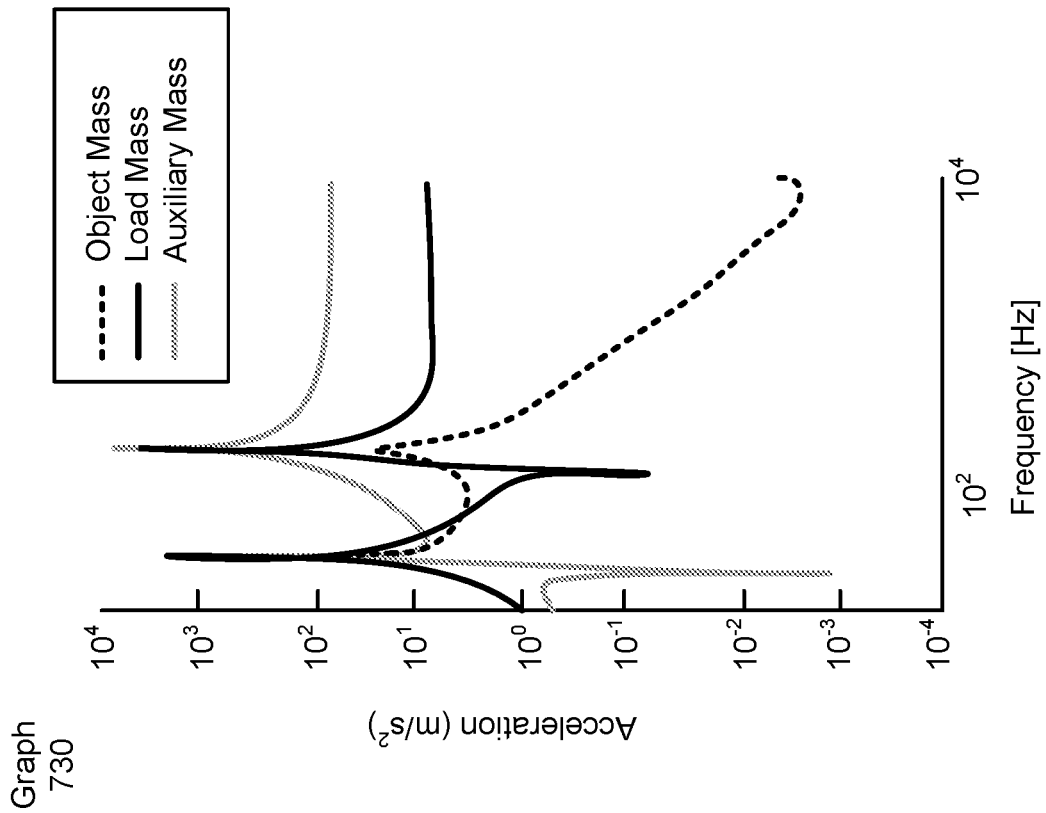
FIG. 7D illustrates an acceleration vs frequency graph for the vibration isolation system of FIG. 7C, in accordance with one or more embodiments.

FIG. 7A illustrates a theoretical one-DOF vibration system 700 without any vibration isolation features, in accordance with one or more embodiments. In FIG. 7A, the system 700 includes a load mass 702, an object mass 704, an auxiliary mass 706, and a spring 708. In some applications, the load mass 702 represents a mechanical output mass loaded by a pinna of a user wearing an eyewear device having a transducer system that is part of a cartilage conduction system. Cartilage conduction systems are described in detail at, e.g., U.S. application Ser. No. 15/967,924, which is hereby incorporated by reference in its entirety. The object mass 704 represents a mass of a device (e.g., an eyewear device). The auxiliary mass 706 represents the mass of magnets (e.g., hard and/or soft) in the transducer. The spring 708 couples the auxiliary mass 706 to the load mass 702. The auxiliary mass 706 is secured (e.g., via a securing mechanism, adhesive, or other suitable method) to the object mass 704. Because two of the masses are tied together, this configuration is a 2-mass, 1-spring system. In this configuration, vibrations produced by the auxiliary mass 706 are transmitted to the object mass 704.

FIG. 7B illustrates an acceleration versus frequency graph 710 for the one-DOF vibration system 700 of FIG. 7A, in accordance with one or more embodiments. The graph 710 plots an acceleration of each mass of the system 700 over frequency. As previously described, the auxiliary mass 706 is secured to the object mass 704, thus causing auxiliary mass 506 to have the same acceleration as the object mass 704. FIG. 7B illustrates in this "hard-mounting" scenario the acceleration of the object mass 704 is not substantially different from load mass 702, i.e. substantial vibration goes into the device.

Figure 7C:
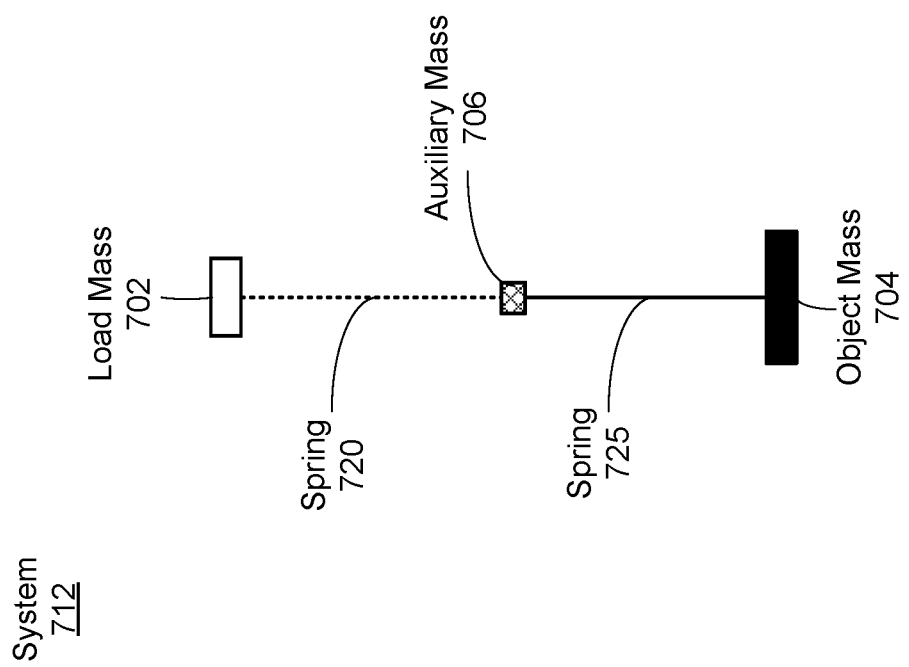
FIG. 7C illustrates a second theoretical vibration isolation system, in accordance with one or more embodiments.
Figure 7F:
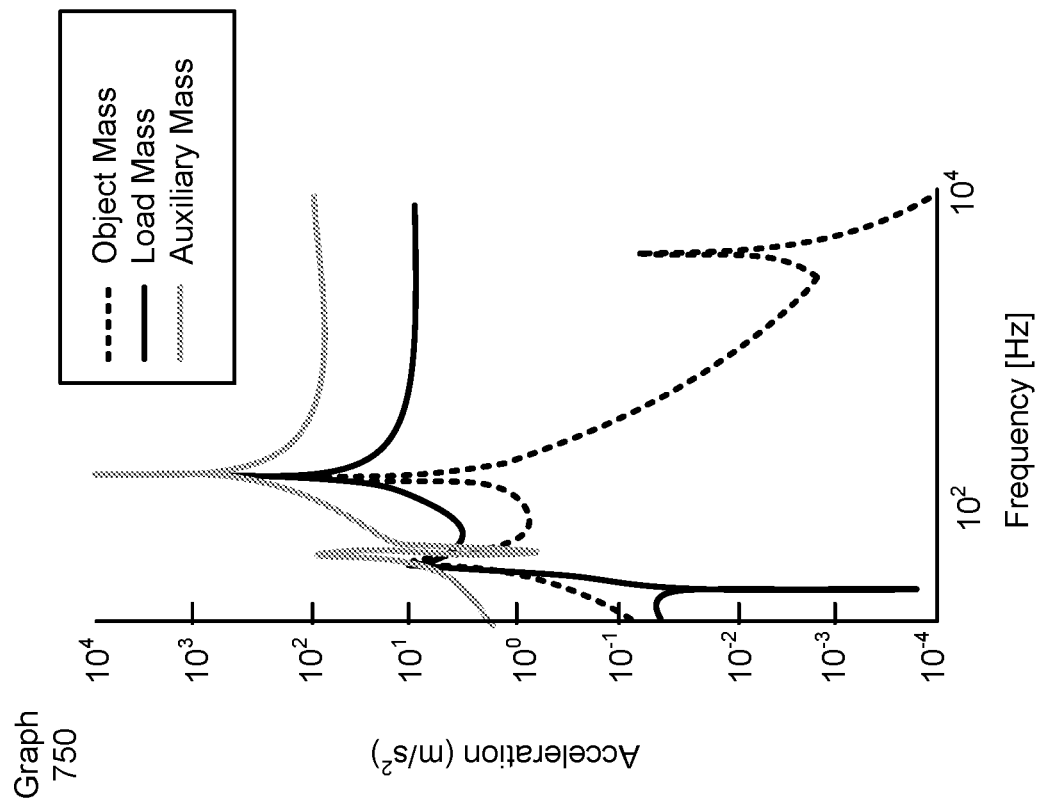
FIG. 7F illustrates an acceleration vs frequency graph for the vibration isolation system of FIG. 7E, in accordance with one or more embodiments.

FIG. 7C illustrates a second theoretical vibration isolation system 712, in accordance with one or more embodiments. In FIG. 7C, the system 712 includes the load mass 702, the object mass 704, the auxiliary mass 706, a spring 720, and a spring 725. The spring 720 couples the auxiliary mass 706 to the load mass 702. The spring 725 couples the auxiliary mass 706 to the object mass 704. This configuration is a 3-mass, 2-spring system. In this configuration, the auxiliary mass 706 is suspended between the load mass 702 and the object mass 704. A force-pair is generated between the load and auxiliary mass.

FIG. 7D illustrates an acceleration vs frequency graph 730 for the vibration isolation system 712 of FIG. 7C, in accordance with one or more embodiments. FIG. 7D illustrates that the acceleration of the object mass 704 is significantly isolated from the acceleration of the load mass 702.

However, this implementation is undesirable because of the notch in the mechanical output (the load mass response).

Figure 7E:
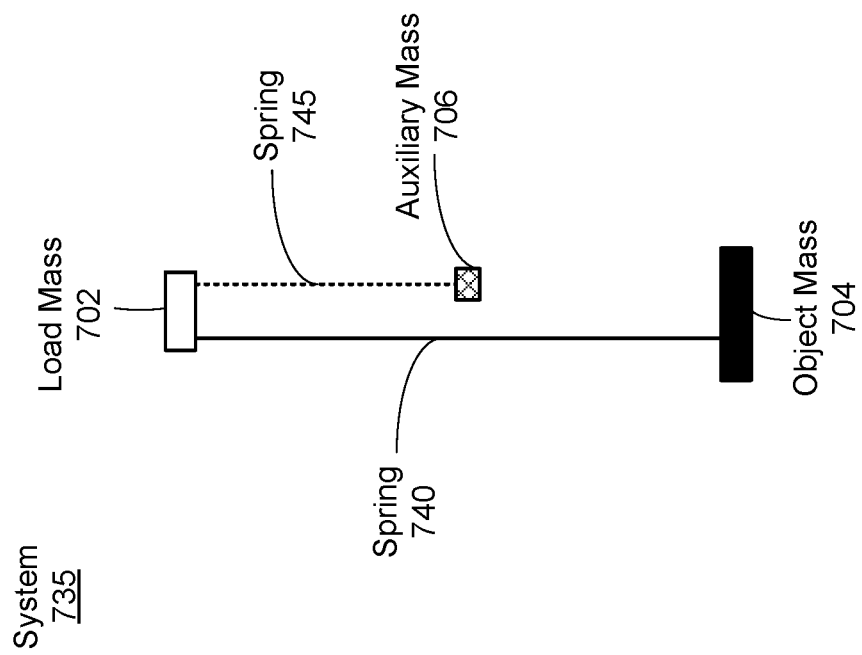
FIG. 7E illustrates a third theoretical vibration isolation system, in accordance with one or more embodiments.
Figure 7H:
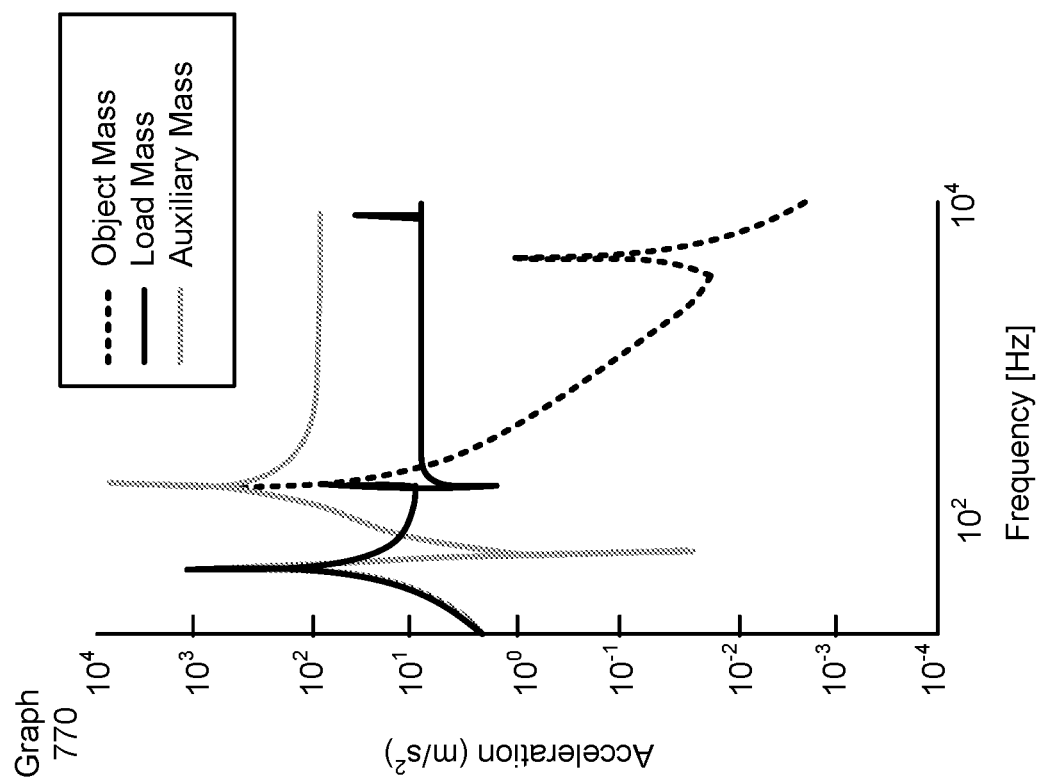
FIG. 7H illustrates an acceleration vs frequency graph for the vibration isolation system of FIG. 7G, in accordance with one or more embodiments.

FIG. 7E illustrates a third theoretical vibration isolation system 735, in accordance with one or more embodiments. In FIG. 7E, the system 735 includes the load mass 702, the object mass 704, the auxiliary mass 706, a spring 740, and a spring 745. The spring 740 couples the load mass 702 to the object mass 704. The spring 745 couples the auxiliary mass 706 to the load mass 702. This configuration is a 3-mass, 2-spring system. In this configuration, the auxiliary mass 706 is suspended from the load mass 702. A force-pair is generated between the load and auxiliary mass. The spring 740 mechanically attaches the transducer to the device and serves to decouple the device from the transducer vibrations.

FIG. 7F illustrates an acceleration vs frequency graph 750 for the vibration isolation system 735 of FIG. 7E, in accordance with one or more embodiments. FIG. 7F illustrates that the acceleration of the load mass 702 is substantially larger than the acceleration of the object mass 704 thus providing significant decoupling of the transducer from the device after approximately 100 Hz.

Figure 7G:
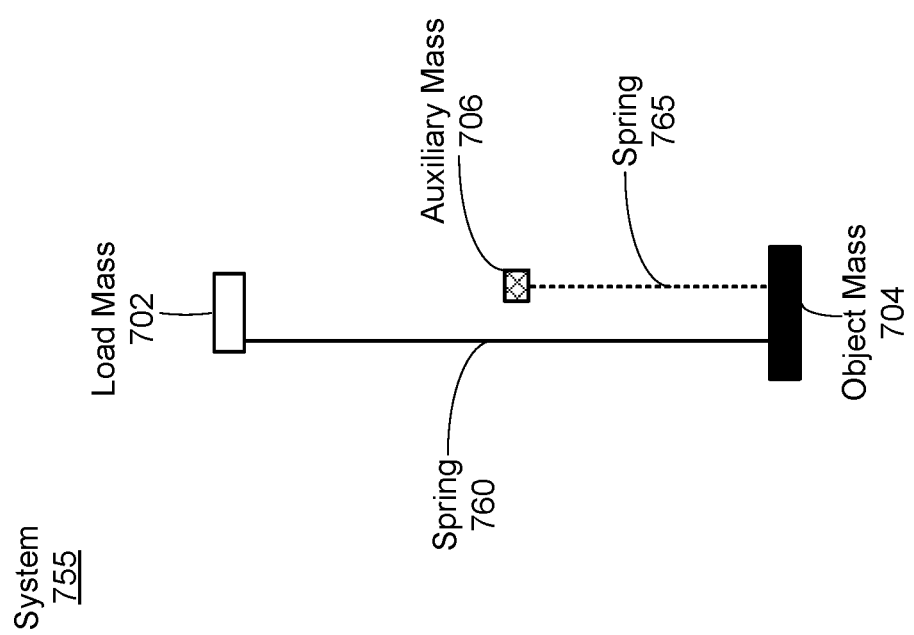
FIG. 7G illustrates a fourth theoretical vibration isolation system, in accordance with one or more embodiments.
Figure 7J:
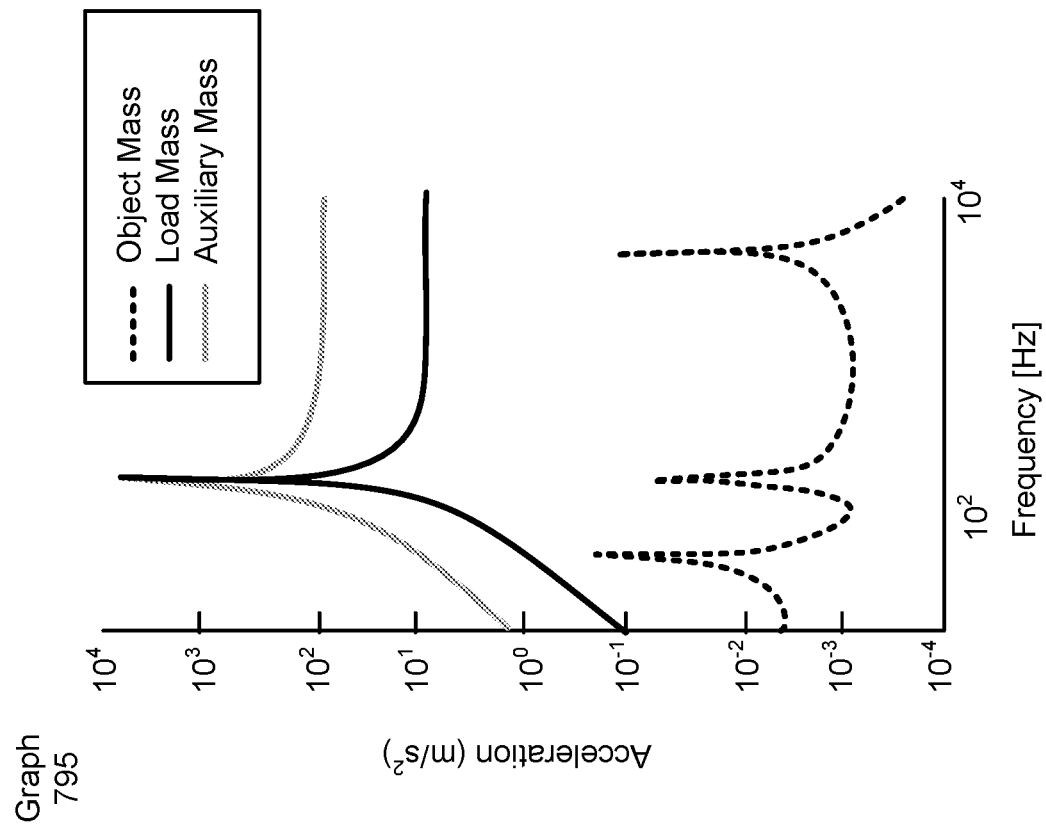
FIG. 7J illustrates an acceleration vs frequency graph for the vibration isolation system of FIG. 7I, in accordance with one or more embodiments.
Figure 7I:
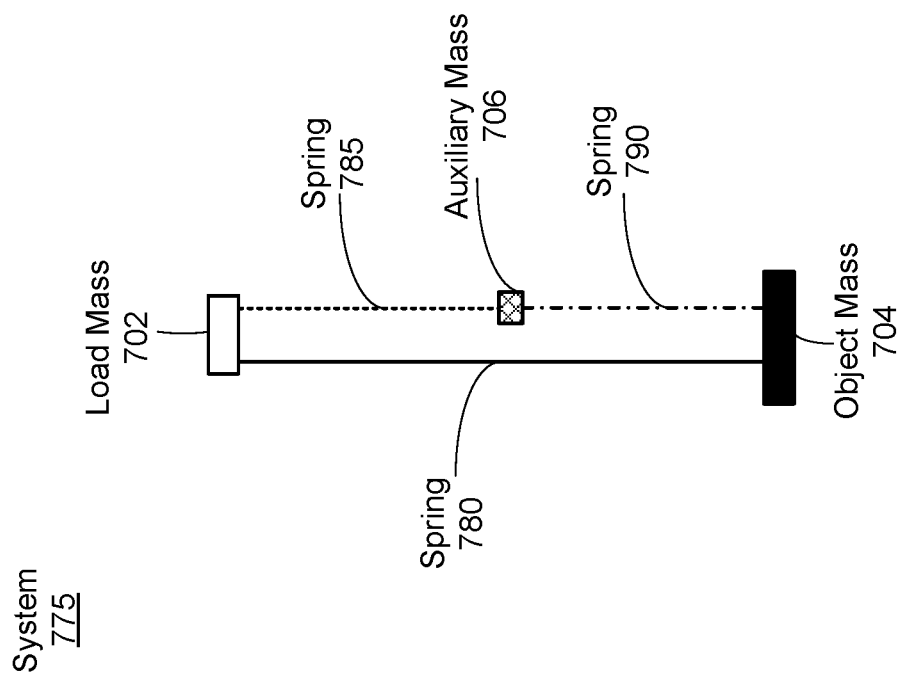
FIG. 7I illustrates a fifth theoretical vibration isolation system, in accordance with one or more embodiments.

FIG. 7G illustrates a fourth theoretical vibration isolation system 755, in accordance with one or more embodiments. In FIG. 7G, the system 755 includes the load mass 702, the object mass 704, the auxiliary mass 706, a spring 760, and a spring 765. The spring 760 couples the load mass 702 to the object mass 704. The spring 765 couples the auxiliary mass 706 to the object mass 704. This configuration is a 3-mass, 2-spring system. In this configuration, the auxiliary mass 706 is suspended from the object mass 704. The auxiliary mass 706 and the spring 765 can be tuned to form a dynamic vibration absorber (DVA) for the transducer, but does not provide any direct coupling between the load mass 702 and the auxiliary mass 706 where the force-pair is generated and that is usually desired for tight alignment between a voice-coil and magnets of the transducer so that this is not a practical embodiment.

FIG. 7H illustrates an acceleration vs frequency graph 770 for the vibration isolation system 755 of FIG. 7G, in accordance with one or more embodiments. Similar to FIG. 7F, FIG. 7H illustrates that the acceleration of the object mass 702 is closely correlated with the acceleration of the auxiliary mass 706 and then decreases relative to the acceleration of the auxiliary mass 706 after a second resonance of the system (e.g., at approximately 100 Hz).

FIG. 7I illustrates a fifth theoretical vibration isolation system 775, in accordance with one or more embodiments. In FIG. 7I, the system 775 includes the load mass 702, the object mass 704, the auxiliary mass 706, a spring 780, a spring 785, and a spring 790. The spring 780 couples the load mass 702 to the object mass 704. The spring 785 couples the auxiliary mass 706 to the load mass 702. A force-pair is generated between the load and auxiliary mass. The spring 790 couples the auxiliary mass 706 (transducer) to the object mass 704. This configuration is a 3-mass, 3-spring system. In this configuration, the auxiliary mass 706 is suspended between the load mass 702 and the object mass 704.

FIG. 7J illustrates an acceleration vs frequency graph 795 for the vibration isolation system 775 of FIG. 7I, in accordance with one or more embodiments. FIG. 7J illustrates that the acceleration of the object mass 704 is significantly isolated from the load mass 702, more than is seen in FIGS. 7B, 7D, 7F, and 7H. The larger separation corelates to increased performance in isolating motion of a transducer from the transferring to the object (e.g., frame of eyewear device). In this configuration, the resonance created by spring 790 and the auxiliary mass 706 absorb vibrations transmitted to the object mass 704. Isolating the vibrations of the load mass 702 and the auxiliary mass 706 reduces the likelihood of the vibrations being carried to other components of a device to which the system 775 is coupled and minimizes mechanical and acoustomechanical coupling. This configuration is what the vibration isolation systems discussed above with regard to FIGS. 2A-6D are based off of.

Figure 8:
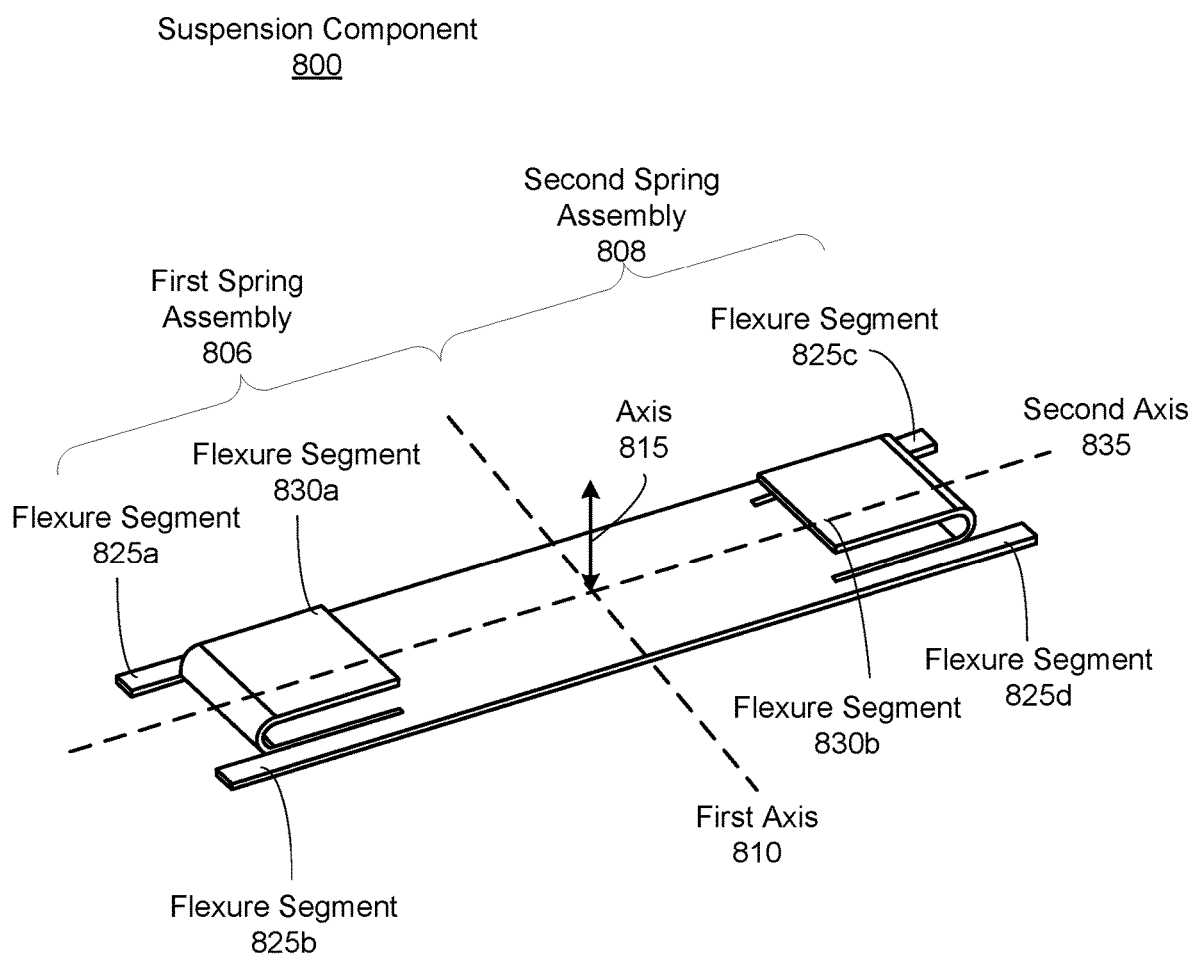
FIG. 8 is a first example of a suspension component, in accordance with one or more embodiments.

FIG. 8 is a first example of a suspension component 800, in accordance with one or more embodiments. The suspension component 800 may be used within a transducer vibration isolation system. The suspension component 800 make up one or more parts of a vibration isolation system (e.g., second bracket flexures 330 and middle flexures 335 of FIG. 3A). In the embodiment of FIG. 8, the suspension component 800 comprises a body formed from a single piece of planar material. A first spring assembly 806 of the body and a second spring assembly 808 of the body are defined by a first axis 810 that bisects the body. Each of the spring assemblies may include one or more flexures (that include one or more flexure segments) which are integrally formed from the body of the suspension component 800. The first spring assembly 806 and the second spring assembly 808 are configured to flex such that the suspension component 800 moves along an axis 815 (corresponds to an axis of motion of a transducer that the suspension component may be coupled to).

The first spring assembly 806 includes a flexure segment 825a, 825b and a flexure segment 830a. Similarly, the second spring assembly 808 includes a flexure segment 825c, 825d and a flexure segment 830b. The flexure segments 825a-825d (collectively referred to as flexure segments 825) are configured to couple the suspension component 800 to support brackets (e.g., the support brackets 320). The flexure segments 825 are substantially planar and rectangular, but the geometry of the flexure segments 825 may vary in other embodiments. In other embodiments, the number, geometry, and arrangement of flexure segments 825 of the first spring assembly 806 and/or the second spring assembly 808 may vary. In the illustrated embodiment, the flexure segments are located such that they are symmetric with respect to both the first axis 810, but also a second axis 835. And the first axis 810 and the second axis 835 are orthogonal to each other and intersect at a vertex point located at a center of the suspension component 800. In other embodiments, the number, geometry, and arrangement (e.g., may have an asymmetric arrangement) of flexure segments 825 of the first spring assembly 806 and/or the second spring assembly 808 may be modified to achieve one or more specific spring constants. For example, a length and/or a width of each flexure segment may be increased or decreased to increase or decrease a stiffness of each flexure segment.

The flexure segment 830a and the flexure segment 830b (collectively referred to as flexure segments 830) are also formed from the body of the suspension component 800. As illustrated, the flexure segments 830 are substantially curved and have a same radius of curvature, but the geometry of the flexure segments 830 may vary in other embodiments. Note that compliance of a spring scales with effective length, accordingly increasing the effective length of the flexure segments 830 can also increase their compliance. In other embodiments, the number, geometry, and arrangement of flexure segments 830 of the first spring assembly 806 and/or the second spring assembly 808 may vary. In the illustrated embodiment, the flexure segments 830 are located such that they are symmetric with respect to both the first axis 810 and the second axis 835. In other embodiments, the number, geometry, and arrangement (e.g., may have an asymmetric arrangement) of flexure segments 830 of the first spring assembly 806 and/or the second spring assembly 808 may be modified to achieve one or more specific spring constants. For example, a length and/or a width of each flexure segment may be increased or decreased to increase or decrease a stiffness of each flexure segment.

In some embodiments, a portion of each flexure segment 830 couples to the lower portion (e.g., the sub-assembly 340) of a transducer (e.g., via a securing mechanism, adhesive, respective mating interfaces, solder, some combination thereof, or other suitable securing methods). As illustrated in FIG. 8, the flexure segments 830 of the are positioned between the flexure segments 825. Positioning the flexure segments 830 between the flexure segments 825 minimizes the number of components within the transducer vibration isolation system, thereby saving space and enabling a smaller form factor for the transducer vibration isolation system.

In one embodiment, the suspension component 800 is composed of sheet metal that is formed to create the first spring assembly 806 and the second spring assembly 808. The sheet metal may be formed via bending, roll forming, deep drawing, stretch forming, shape-setting, or other suitable manufacturing processes. The sheet metal may be pre-processed to create the flexure segments of the first spring assembly 806 and the second spring assembly 808. In other words, a shape of each flexure segment may be cut into the sheet metal before one or more flexure segments are formed into a final geometry. After the flexure segments are cut and formed, post-processing may include an electrode-posited coating. The sheet metal may be composed of aluminum, brass, copper, steel, nickel, titanium, alloys, or other suitable types of metal. In one embodiment, the suspension component 800 is composed of nitinol, a shape memory alloy, that is shape set by applying heat to the suspension component 800 in its desired geometry. A thickness of the sheet metal may range between 25 um and 500 um. The thickness of the sheet metal may be selected to modify the spring constants associated with the flexures of the first spring assembly 806 and the second spring assembly 808.

In the embodiment of FIG. 8, the suspension component 800 is symmetric about the first axis 810. In some embodiments, the suspension component 800 is also symmetric about the second axis 835 that bisects the body. The symmetrical design of the suspension component 800 improves the stability of the suspension component 800 within the transducer vibration isolation system by minimizing a likelihood of the suspension component 800 exhibiting unintended degrees of freedom: swinging back and forth, rocking, twisting, etc. as the transducer produces vibrations. In alternate embodiments, a suspension component may be rotationally symmetric. Alternate embodiments of suspension components are discussed with regard to FIGS. 9-11B.

Figure 9:
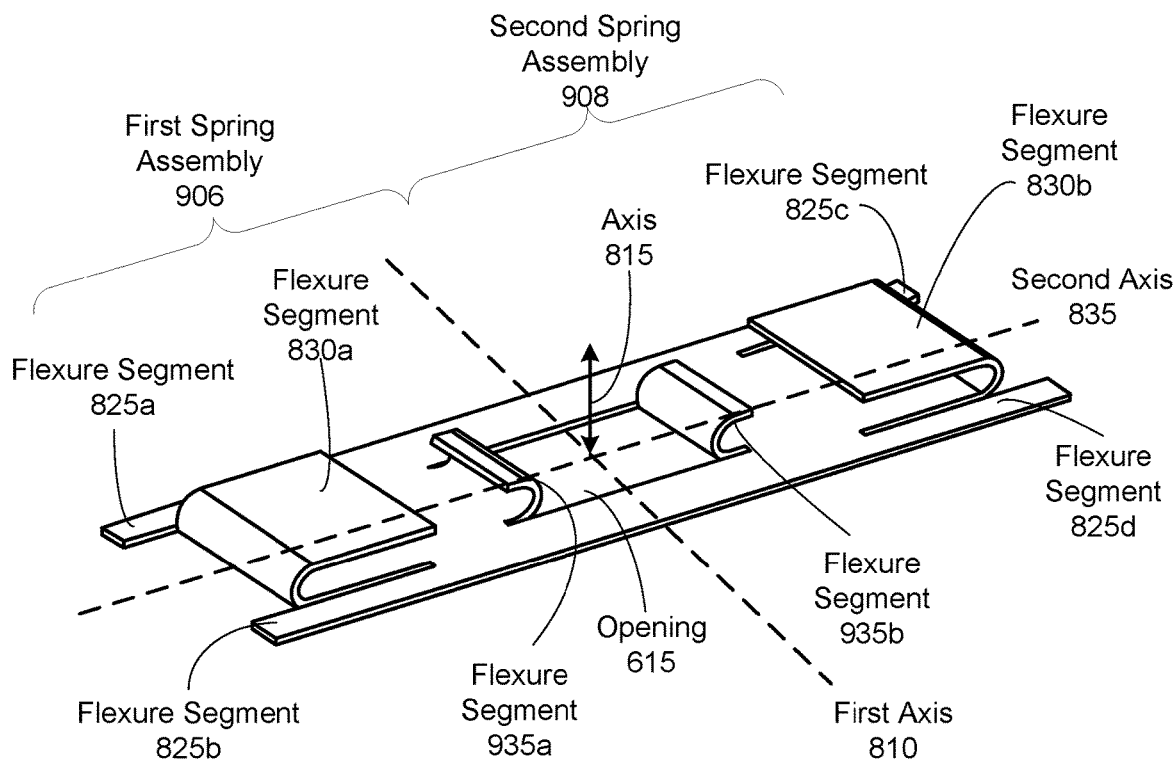
FIG. 9 is a second example of a suspension component, in accordance with one or more embodiments.

FIG. 9 is a second example of a suspension component 900, in accordance with one or more embodiments. The suspension component 900 may be used within a transducer vibration isolation system. The suspension component 900 may be used within a transducer vibration isolation system. The suspension component 900 make up one or more parts of a vibration isolation system (e.g., second bracket flexures 330 and middle flexures 335 of FIG. 3A). In the embodiment of FIG. 9, the suspension component 900 comprises a body formed from a single piece of planar material. A first spring assembly 906 of the body and a second spring assembly 908 of the body are defined by the first axis 810 that bisects the body. Each of the spring assemblies may include one or more flexures (that include one or more flexure segments) which are integrally formed from the body of the suspension component 900. The first spring assembly 906 and the second spring assembly 908 are configured to flex such that the suspension component 900 moves along the axis 815 (corresponds to an axis of motion of a transducer that the suspension component may be coupled to).

The suspension component 900 is substantially the same as the suspension component 800 except that its spring assemblies include additional flexure segments. The first spring assembly 906 includes the flexure segments 825a, 825b, the flexure segment 830a, and a flexure segment 935a. Similarly, the second spring assembly 908 includes the flexure segments 825c, 825d, the flexure segment 830b, and a flexure segment 935b.

The flexure segment 935a and the flexure segment 935b (collectively referred to as flexure segments 935) are also formed from the body of the suspension component 900. As illustrated, the flexure segments 935 are substantially curved and have a same radius of curvature, but the geometry of the flexure segments 935 may vary in other embodiments. The flexures 935 are folded in from a center of the suspension component 900 such that there is an opening between the two flexure segment 935a and the flexure segment 935b. In other embodiments, the number, geometry, and arrangement of flexure segments 935 of the first spring assembly 906 and/or the second spring assembly 908 may vary. In the illustrated embodiment, the flexure segments 935 are located such that they are symmetric with respect to both the first axis 810 and the second axis 835. In other embodiments, the number, geometry, and arrangement (e.g., may have an asymmetric arrangement) of flexure segments 935 of the first spring assembly 906 and/or the second spring assembly 908 may be modified to achieve one or more specific spring constants. For example, a length and/or a width of each flexure segment may be increased or decreased to increase or decrease a stiffness of each flexure segment.

In some embodiments, a portion of each flexure segment 935 couples to a sub-assembly (e.g., the sub-assembly 340) of a transducer (e.g., via a securing mechanism, adhesive, respective mating interfaces, solder, some combination thereof, or other suitable securing methods). As illustrated in FIG. 9, the flexure segments 935 of the are positioned between the flexure segments 830 along the second axis 835. Positioning the flexure segments 835 between the flexure segments 830 minimizes the number of components within the transducer vibration isolation system, thereby saving space and enabling a smaller form factor for the transducer vibration isolation system.

Figure 10A:
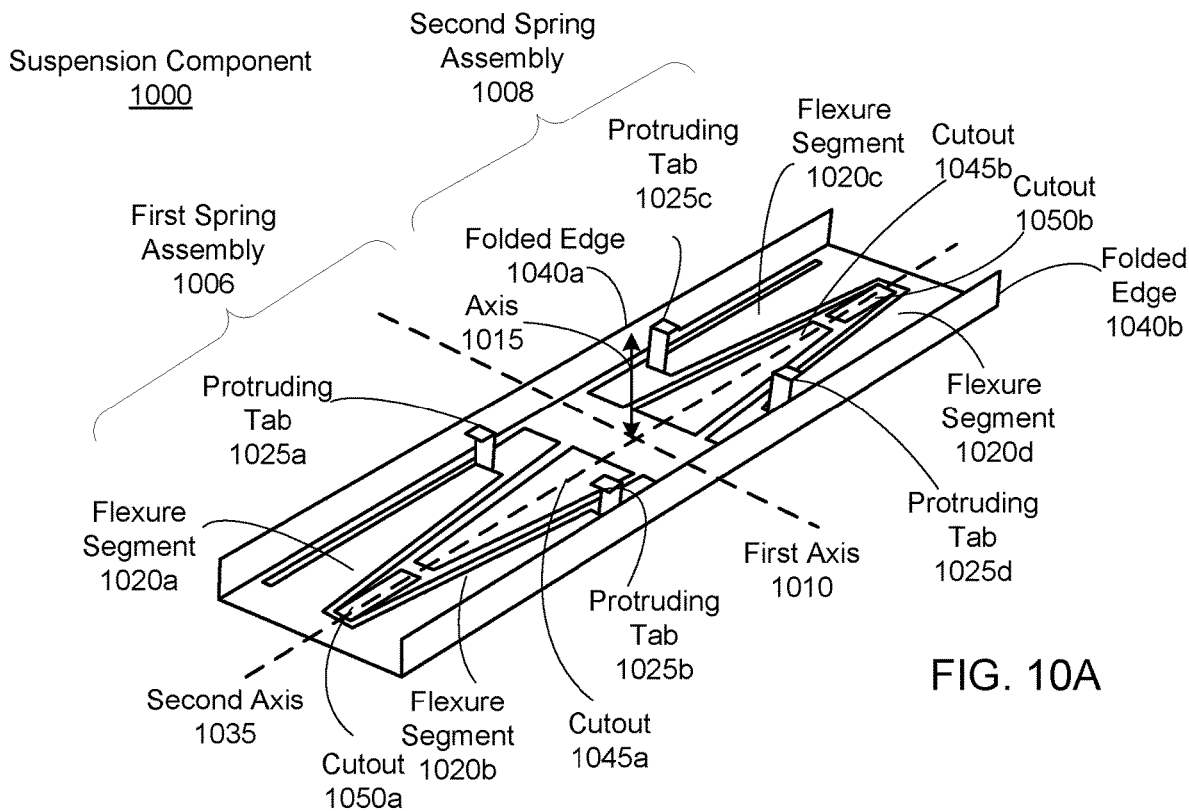
FIG. 10A is a perspective view of a first example of a suspension component, in accordance with one or more embodiments.

FIG. 10A is a perspective view of a first example of a suspension component 1000, in accordance with one or more embodiments. The suspension component 1000 may be used within a transducer vibration isolation system. The suspension component 1000 may be used within a transducer vibration isolation system. In the embodiment of FIG. 10A, the suspension component 1000 comprises a body formed from a single piece of planar material. A first spring assembly 1006 of the body and a second spring assembly 1008 of the body are defined by a first axis 1010 that bisects the body. Each of the spring assemblies may include one or more flexures (that include one or more flexure segments) which are integrally formed from the body of the suspension component 1000. The first spring assembly 1006 and the second spring assembly 1008 are configured to flex such that the suspension component 1000 moves along the axis 1015 (corresponds to an axis of motion of a transducer that the suspension component may be coupled to).

The first spring assembly 1006 includes a flexure segment 1020a and a flexure segment 1020b. Similarly, the second spring assembly 1008 includes a flexure segment 1020c and a flexure segment 1020d. The flexure segments 1020a-1020d (collectively referred to as flexure segments 1020) are configured to couple the suspension component 1000 to a portion of a transducer. Note each of the flexure segments 1020 includes a corresponding protruding tab, specifically, the flexure segments 1020a, 1020b, 1020c, and 1020d include respective protruding tabs 1025a, 1025b, 1025c, and 1025d (collectively protruding tabs 1025). The protruding tabs 1025 may facilitate a strong coupling to the transducer. The protruding tabs 1025 may couple to a portion of the transducer via securing mechanisms, adhesive, respective mating interfaces, solder, some combination thereof, or other suitable securing methods. In some embodiments, the protruding tabs 1025 are removably coupled to the portion of the transducer.

In the illustrated embodiment, the flexure segments 1020 are substantially planar, but the geometry of the flexure segments 1020 may vary in other embodiments. In other embodiments, the number, geometry, and arrangement of flexure segments 1020 of the first spring assembly 1006 and/or the second spring assembly 1008 may vary. In the illustrated embodiment, the flexure segments 1020 are located such that they are symmetric with respect to both the first axis 1010, but also a second axis 1035. And the first axis 1010 and the second axis 1035 orthogonal to each other and intersect at a vertex point located at a center of the suspension component 1000. In other embodiments, the number, geometry, and arrangement (e.g., may have an asymmetric arrangement) of flexure segments 1020 of the first spring assembly 1006 and/or the second spring assembly 1008 may be modified to achieve one or more specific spring constants. For example, a length and/or a width of each flexure segment may be increased or decreased to increase or decrease a stiffness of each flexure segment.

In some embodiments, the body of the suspension component 1000 may include one or more cutouts to modify one or more spring constants of the flexure segments 1020 of the first spring assembly 1006 and/or the spring assembly 1008. For example, as illustrated the first spring assembly 1006 includes cutouts 1045a and 1050a, and the second spring assembly 1008 includes cutouts 1045b and 1050b. In other embodiments, the size of and/or number of cutouts may differ from what is in FIG. 10A. Note that the body of the suspension component 1000 also includes a folded edge 1040a and a folded edge 1040b (collectively referred to as folded edges 1040) on respective long sides of the suspension component 1000. The folded edges 1040 provide additional structural stability to the suspension component 1000 and can act to increase stiffness of the suspension component 1000. The increased rigidity imparted to the suspension component 1000 may make it easier to handle (e.g., install) without deformation while having little to no impact on stiffness of the flexures.

Figure 10B:
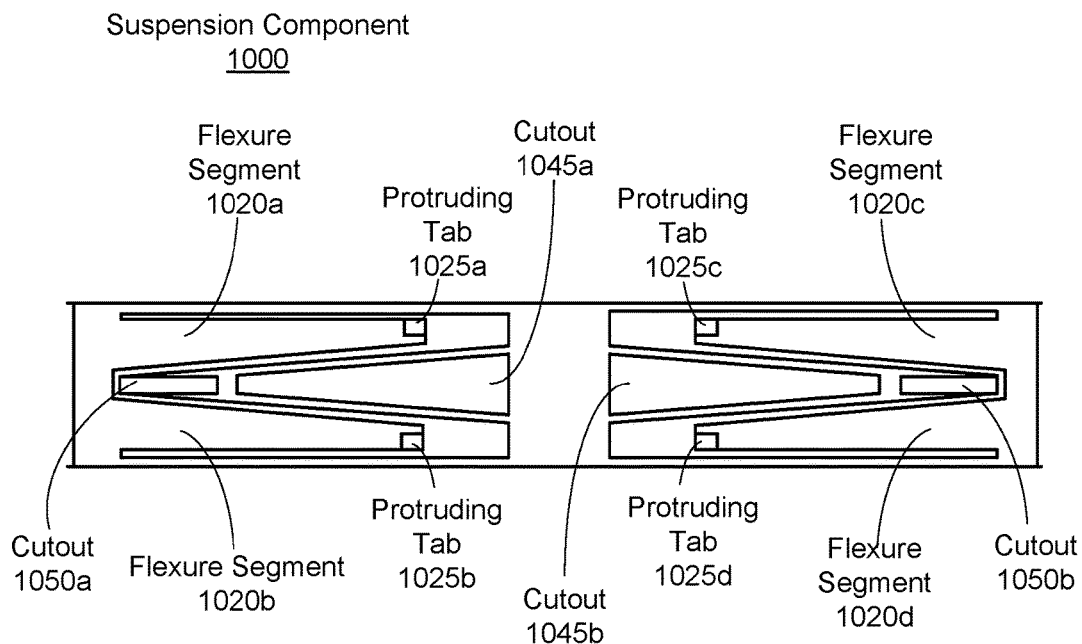
FIG. 10B is a top view of the first example of the suspension component of FIG. 10A, in accordance with one or more embodiments.

FIG. 10B is a top view of the first example of the suspension component 1000 of FIG. 10A, in accordance with one or more embodiments. As illustrated in FIG. 10B, the suspension component 1000 is symmetric about one or more axes.

Figure 11A:
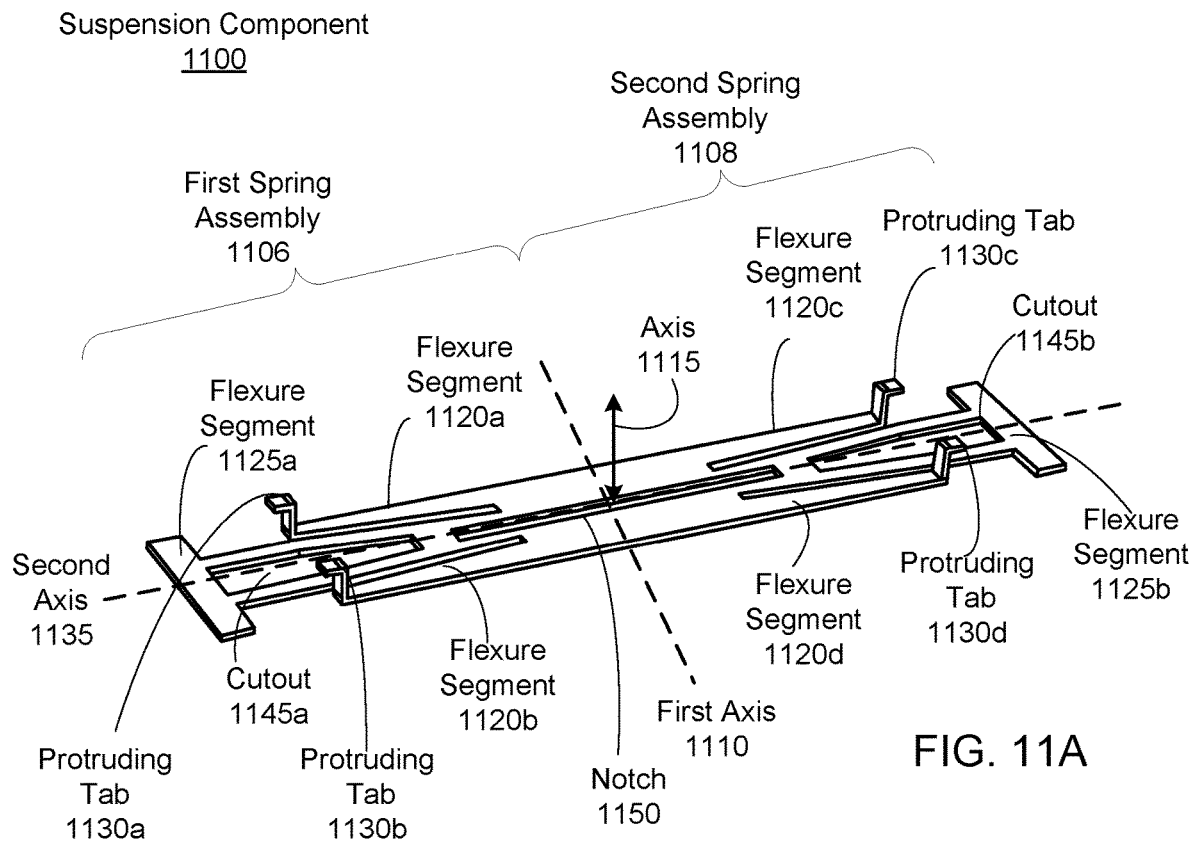
FIG. 11A is a perspective view of a second example of a suspension component, in accordance with one or more embodiments.

FIG. 11A is a perspective view of a second example of a suspension component 1100, in accordance with one or more embodiments. The suspension component 1100 may be used within a transducer vibration isolation system. In the embodiment of FIG. 11A, the suspension component 1100 comprises a body formed from a single piece of planar material. A first spring assembly 1106 of the body and a second spring assembly 1108 of the body are defined by a first axis 1110 that bisects the body. Each of the spring assemblies may include one or more flexures (that include one or more flexure segments) which are integrally formed from the body of the suspension component 1100. The first spring assembly 1106 and the second spring assembly 1108 are configured to flex such that the suspension component 1100 moves along the axis 1115 (corresponds to an axis of motion of a transducer that the suspension component may be coupled to).

The first spring assembly 1106 includes a flexure segment 1120a, a flexure segment 1120b, and a flexure segment 1125a. Similarly, second spring assembly 1108 includes a flexure segment 1120c, a flexure segment 1120d, and a flexure segment 1125b. The flexure segments 1120a-1020d (collectively referred to as flexure segments 1120) are configured to couple the suspension component 1100 to a portion of a transducer. Note each of the flexure segments 1120 includes a corresponding protruding tab, specifically, the flexure segments 1120a, 1120b, 1120c, and 1120d include respective protruding tabs 1130a, 1130b, 1130c, and 1130d (collectively protruding tabs 1130). The protruding tabs 1130 may facilitate a strong coupling to the transducer. The protruding tabs 1130 may couple to a portion of the transducer via securing mechanisms, adhesive, respective mating interfaces, solder, some combination thereof, or other suitable securing methods. In some embodiments, the protruding tabs 1130 are removably coupled to the portion of the transducer.

In the illustrated embodiment, the flexure segments 1120 are substantially planar, but the geometry of the flexure segments 1120 may vary in other embodiments. In other embodiments, the number, geometry, and arrangement of flexure segments 1120 of the first spring assembly 1106 and/or the second spring assembly 1108 may vary. In the illustrated embodiment, the flexure segments 1120 are located such that they are symmetric with respect to both the first axis 1110, but also a second axis 1135. And the first axis 1110 and the second axis 1135 orthogonal to each other and intersect at a vertex point located at a center of the suspension component 1100. In other embodiments, the number, geometry, and arrangement (e.g., may have an asymmetric arrangement) of flexure segments 1120 of the first spring assembly 1106 and/or the second spring assembly 1108 may be modified to achieve one or more specific spring constants. For example, a length and/or a width of each flexure segment may be increased or decreased to increase or decrease a stiffness of each flexure segment.

In some embodiments, the body of the suspension component 1100 may include one or more cutouts. The cutouts may be used to, e.g., provide a mounting location or mechanical interlock to a rigid structure (including a coil assembly) of a transducer. For example, the suspension component 1100 includes a notch 1150. The notch 1150 may couple to a rigid structure (e.g., the rigid structure 270) of the transducer. The cutouts may also be used to modify one or more spring constants of the flexure segments 1120 of the first spring assembly 1106 and/or the spring assembly 1108. For example, as illustrated the first spring assembly 1106 includes a cutout 1145a and the second spring assembly 1108 includes cutout 1145b. In other embodiments, the size of and/or number of cutouts may differ from what is in FIG. 11A.

Figure 11B:
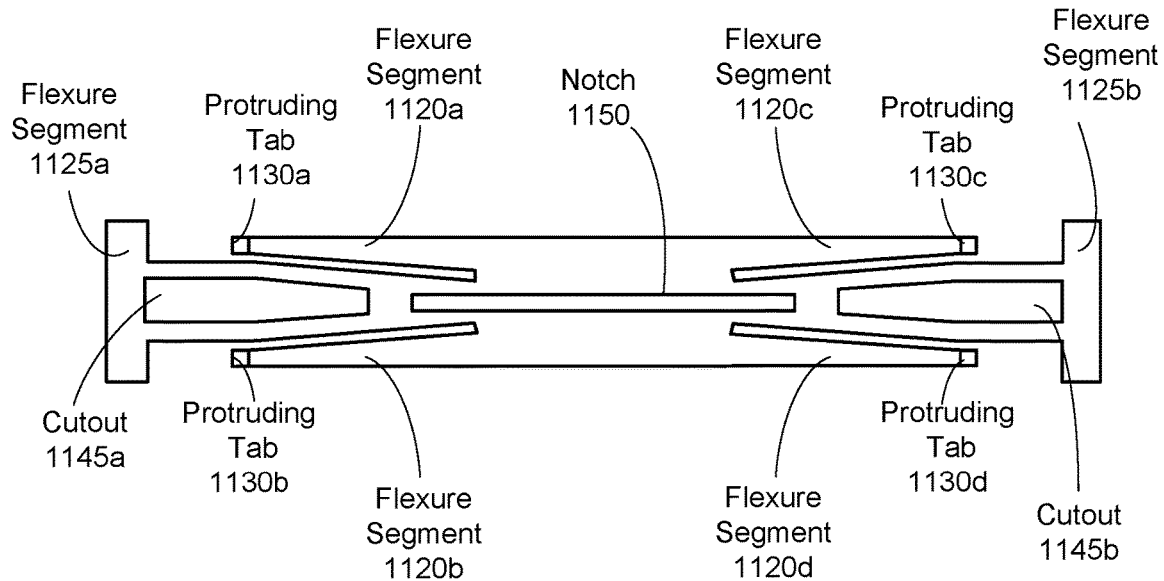
FIG. 11B is a top view of the second example of the suspension component of FIG. 11B, in accordance with one or more embodiments.

FIG. 11B is a top view of the second example of the suspension component of FIG. 11B, in accordance with one or more embodiments. As illustrated in FIG. 11B, the suspension component 1100 is symmetric about one or more axes.

Aspects of each example suspension component described herein may be used in combination with another.

Example System Environment

Figure 12:
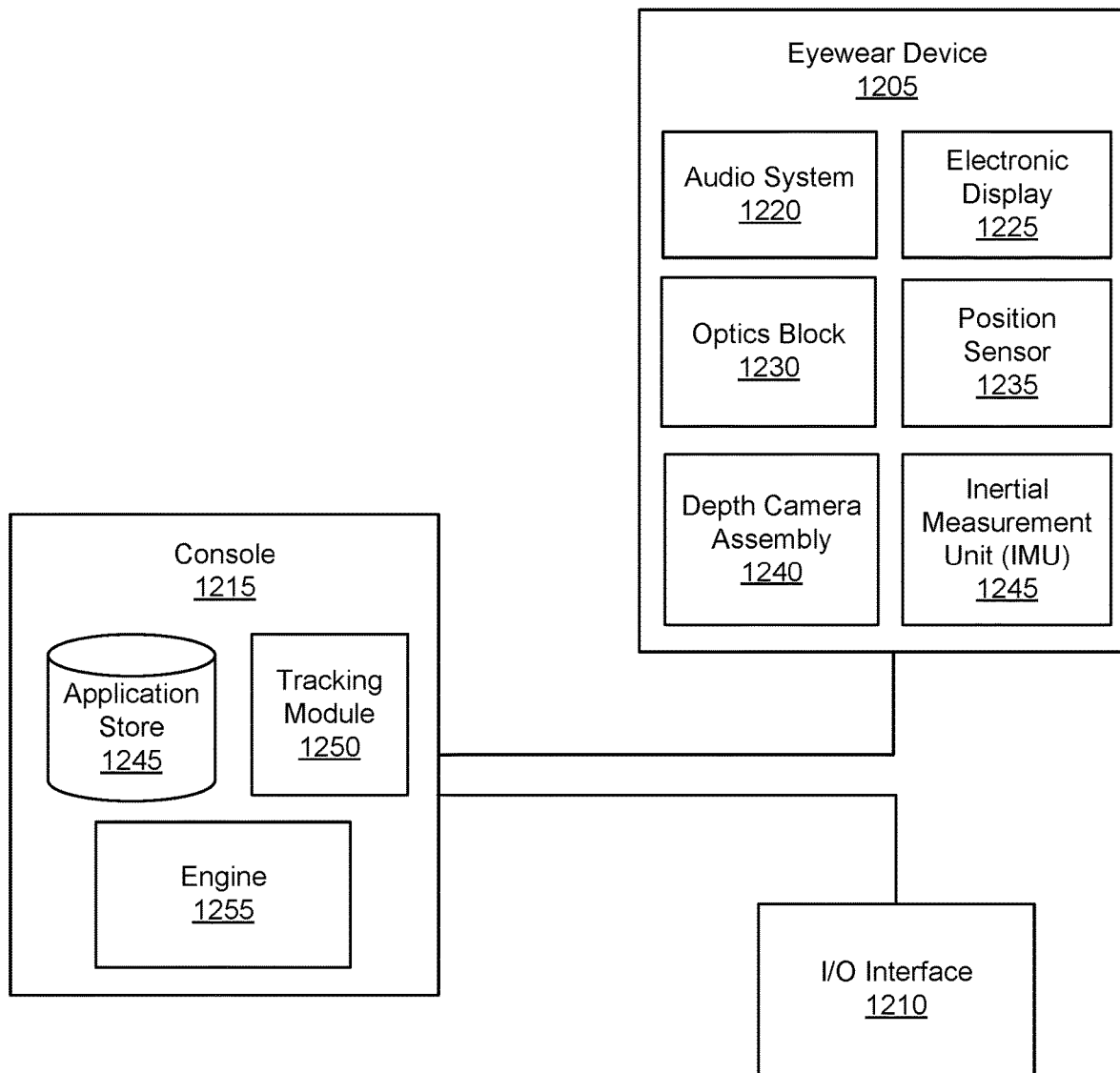
FIG. 12 is a system environment of an eyewear device, in accordance with one or more embodiments.

FIG. 12 is a system environment of an eyewear device, in accordance with one or more embodiments. The system 1200 may operate in an artificial reality environment. The system 1200 shown in FIG. 12 includes an eyewear device 1205 and an input/output (I/O) interface 1210 that is coupled to a console 1215. The eyewear device 1205 may be an embodiment of the eyewear device 100. While FIG. 12 shows an example system 1200 including one eyewear device 1205 and one I/O interface 1210, in other embodiments any number of these components may be included in the system 1200. For example, there may be multiple eyewear devices 1205 each having an associated I/O interface 1210 with each eyewear device 1205 and I/O interface 1210 communicating with the console 1215. In alternative configurations, different and/or additional components may be included in the system 1200. Additionally, functionality described in conjunction with one or more of the components shown in FIG. 12 may be distributed among the components in a different manner than described in conjunction with FIG. 12 in some embodiments. For example, some or all of the functionality of the console 1215 is provided by the eyewear device 1205.

In some embodiments, the eyewear device 1205 may correct or enhance the vision of a user, protect the eye of a user, or provide images to a user. The eyewear device 1205 may be eyeglasses which correct for defects in a user's eyesight. The eyewear device 1205 may be sunglasses which protect a user's eye from the sun. The eyewear device 1205 may be safety glasses which protect a user's eye from impact. The eyewear device 1205 may be a night vision device or infrared goggles to enhance a user's vision at night. Alternatively, the eyewear device 1205 may not include lenses and may be just a frame with an audio system 1220 that provides audio (e.g., music, radio, podcasts) to a user.

In some embodiments, the eyewear device 1205 may be a head-mounted display that presents content to a user comprising augmented views of a physical, real-world environment with computer-generated elements (e.g., two dimensional (2D) or three dimensional (3D) images, 2D or 3D video, sound, etc.). In some embodiments, the presented content includes audio that is presented via an audio system 1220 that receives audio information from the eyewear device 1205, the console 1215, or both, and presents audio data based on the audio information. In some embodiments, the eyewear device 1205 presents virtual content to the user that is based in part on a real environment surrounding the user. For example, virtual content may be presented to a user of the eyewear device. The user physically may be in a room, and virtual walls and a virtual floor of the room are rendered as part of the virtual content. In the embodiment of FIG. 12, the eyewear device 1205 includes an audio system 1220, an electronic display 1225, an optics block 1230, a position sensor 1235, a depth camera assembly (DCA) 1240, and an inertial measurement (IMU) unit 1245. Some embodiments of the eyewear device 1205 have different components than those described in conjunction with FIG. 12. Additionally, the functionality provided by various components described in conjunction with FIG. 12 may be distributed differently among the components of the eyewear device 1205 in other embodiments or be captured in separate assemblies remote from the eyewear device 1205.

The audio system 1220 detects sound in a local environment surrounding the eyewear device 1205. The audio system 1220 may include a microphone array, a controller, and a speaker assembly, among other components. The microphone array detects sounds within a local area surrounding the microphone array. The microphone array may include a plurality of acoustic sensors that each detect air pressure variations of a sound wave and convert the detected sounds into an electronic format (analog or digital). The plurality of acoustic sensors may be positioned on an eyewear device (e.g., eyewear device 100), on a user (e.g., in an ear canal of the user), on a neckband, or some combination thereof. The speaker assembly provides audio content using, e.g., cartilage conduction and/or bone conduction technologies. Cartilage conduction and bone conduction systems are described in detail at, e.g., U.S. application Ser. No. 15/967,924, which is hereby incorporated by reference in its entirety. The speaker assembly includes one or more transducer systems used to provide audio content to the user of the eyewear device 1205. The transducer systems could be any one of the transducer systems shown and described above and/or transducers coupled to suspension components as shown and described above.

The electronic display 1225 displays 2D or 3D images to the user in accordance with data received from the console 1215. In various embodiments, the electronic display 1225 comprises a single electronic display or multiple electronic displays (e.g., a display for each eye of a user). Examples of the electronic display 1225 include: a liquid crystal display (LCD), an organic light emitting diode (OLED) display, an active-matrix organic light-emitting diode display (AMOLED), some other display, or some combination thereof.

The optics block 1230 magnifies image light received from the electronic display 1225, corrects optical errors associated with the image light, and presents the corrected image light to a user of the eyewear device 1205. The electronic display 1225 and the optics block 1230 may be an embodiment of the lens 110. In various embodiments, the optics block 1230 includes one or more optical elements. Example optical elements included in the optics block 1230 include: an aperture, a Fresnel lens, a convex lens, a concave lens, a filter, a reflecting surface, or any other suitable optical element that affects image light. Moreover, the optics block 1230 may include combinations of different optical elements. In some embodiments, one or more of the optical elements in the optics block 1230 may have one or more coatings, such as partially reflective or anti-reflective coatings.

Magnification and focusing of the image light by the optics block 1230 allows the electronic display 1225 to be physically smaller, weigh less, and consume less power than larger displays. Additionally, magnification may increase the field of view of the content presented by the electronic display 1225. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 1230 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 1225 for display is pre-distorted, and the optics block 1230 corrects the distortion when it receives image light from the electronic display 1225 generated based on the content.

The DCA 1240 captures data describing depth information for a local area surrounding the eyewear device 1205. In one embodiment, the DCA 1240 may include a structured light projector, an imaging device, and a controller. The captured data may be images captured by the imaging device of structured light projected onto the local area by the structured light projector. In one embodiment, the DCA 1240 may include two or more cameras that are oriented to capture portions of the local area in stereo and a controller. The captured data may be images captured by the two or more cameras of the local area in stereo. The controller computes the depth information of the local area using the captured data. Based on the depth information, the controller determines absolute positional information of the eyewear device 1205 within the local area. The DCA 1240 may be integrated with the eyewear device 1205 or may be positioned within the local area external to the eyewear device 1205. In the latter embodiment, the controller of the DCA 1240 may transmit the depth information to a controller of the audio system 1220.

The IMU 1245 is an electronic device that generates data indicating a position of the eyewear device 1205 based on measurement signals received from one or more position sensors 1235. The one or more position sensors 1235 may be an embodiment of the sensor device 115. A position sensor 1235 generates one or more measurement signals in response to motion of the eyewear device 1205. Examples of position sensors 1235 include: one or more accelerometers, one or more gyroscopes, one or more magnetometers, another suitable type of sensor that detects motion, a type of sensor used for error correction of the IMU 1245, or some combination thereof. The position sensors 1235 may be located external to the IMU 1245, internal to the IMU 1245, or some combination thereof.

Based on the one or more measurement signals from one or more position sensors 1235, the IMU 1245 generates data indicating an estimated current position of the eyewear device 1205 relative to an initial position of the eyewear device 1205. For example, the position sensors 1235 include multiple accelerometers to measure translational motion (forward/back, up/down, left/right) and multiple gyroscopes to measure rotational motion (e.g., pitch, yaw, and roll). In some embodiments, the IMU 1245 rapidly samples the measurement signals and calculates the estimated current position of the eyewear device 1205 from the sampled data. For example, the IMU 1245 integrates the measurement signals received from the accelerometers over time to estimate a velocity vector and integrates the velocity vector over time to determine an estimated current position of a reference point on the eyewear device 1205. Alternatively, the IMU 1245 provides the sampled measurement signals to the console 1215, which interprets the data to reduce error. The reference point is a point that may be used to describe the position of the eyewear device 1205. The reference point may generally be defined as a point in space or a position related to the eyewear device's 1205 orientation and position.

The IMU 1245 receives one or more parameters from the console 1215. As further discussed below, the one or more parameters are used to maintain tracking of the eyewear device 1205. Based on a received parameter, the IMU 1245 may adjust one or more IMU parameters (e.g., sample rate). In some embodiments, data from the DCA 1240 causes the IMU 1245 to update an initial position of the reference point so it corresponds to a next position of the reference point. Updating the initial position of the reference point as the next calibrated position of the reference point helps reduce accumulated error associated with the current position estimated the IMU 1245. The accumulated error, also referred to as drift error, causes the estimated position of the reference point to "drift" away from the actual position of the reference point over time. In some embodiments of the eyewear device 1205, the IMU 1245 may be a dedicated hardware component. In other embodiments, the IMU 1245 may be a software component implemented in one or more processors.

The I/O interface 1210 is a device that allows a user to send action requests and receive responses from the console 1215. An action request is a request to perform a particular action. For example, an action request may be an instruction to start or end capture of image or video data, start or end the audio system 1220 from producing sounds, start or end a calibration process of the eyewear device 1205, or an instruction to perform a particular action within an application. The I/O interface 1210 may include one or more input devices. Example input devices include: a keyboard, a mouse, a game controller, or any other suitable device for receiving action requests and communicating the action requests to the console 1215. An action request received by the I/O interface 1210 is communicated to the console 1215, which performs an action corresponding to the action request. In some embodiments, the I/O interface 1215 includes an IMU 1245, as further described above, that captures calibration data indicating an estimated position of the I/O interface 1210 relative to an initial position of the I/O interface 1210. In some embodiments, the I/O interface 1210 may provide haptic feedback to the user in accordance with instructions received from the console 1215. For example, haptic feedback is provided when an action request is received, or the console 1215 communicates instructions to the I/O interface 1210 causing the I/O interface 1210 to generate haptic feedback when the console 1215 performs an action.

The console 1215 provides content to the eyewear device 1205 for processing in accordance with information received from one or more of: the eyewear device 1205 and the I/O interface 1210. In the example shown in FIG. 12, the console 1215 includes an application store 1245, a tracking module 1250, and an engine 1255. Some embodiments of the console 1215 have different modules or components than those described in conjunction with FIG. 12. Similarly, the functions further described below may be distributed among components of the console 1215 in a different manner than described in conjunction with FIG. 12.

The application store 1245 stores one or more applications for execution by the console 1245. An application is a group of instructions, that when executed by a processor, generates content for presentation to the user. Content generated by an application may be in response to inputs received from the user via movement of the eyewear device 1205 or the I/O interface 1210. Examples of applications include: gaming applications, conferencing applications, video playback applications, calibration processes, or other suitable applications.

The tracking module 1250 calibrates the system environment 1200 using one or more calibration parameters and may adjust one or more calibration parameters to reduce error in determination of the position of the eyewear device 1205 or of the I/O interface 1210. Calibration performed by the tracking module 1250 also accounts for information received from the IMU 1245 in the eyewear device 1205 and/or an IMU 1245 included in the I/O interface 1210. Additionally, if tracking of the eyewear device 1205 is lost, the tracking module 1250 may re-calibrate some or all of the system environment 1200.

The tracking module 1250 tracks movements of the eyewear device 1205 or of the I/O interface 1210 using information from the one or more sensor devices 1235, the IMU 1245, or some combination thereof. For example, the tracking module 1250 determines a position of a reference point of the eyewear device 1205 in a mapping of a local area based on information from the eyewear device 1205. The tracking module 1250 may also determine positions of the reference point of the eyewear device 1205 or a reference point of the I/O interface 1210 using data indicating a position of the eyewear device 1205 from the IMU 1245 or using data indicating a position of the I/O interface 1210 from an IMU 1245 included in the I/O interface 1210, respectively. Additionally, in some embodiments, the tracking module 1250 may use portions of data indicating a position or the eyewear device 1205 from the IMU 1245 to predict a future location of the eyewear device 1205. The tracking module 1250 provides the estimated or predicted future position of the eyewear device 1205 or the I/O interface 1210 to the engine 1255.

The engine 1255 also executes applications within the system environment 1200 and receives position information, acceleration information, velocity information, predicted future positions, audio information, or some combination thereof of the eyewear device 1205 from the tracking module 1250. Based on the received information, the engine 1255 determines content to provide to the eyewear device 1205 for presentation to the user. For example, if the received information indicates that the user has looked to the left, the engine 1255 generates content for the eyewear device 1205 that mirrors the user's movement in a virtual environment or in an environment augmenting the local area with additional content. Additionally, the engine 1255 performs an action within an application executing on the console 1215 in response to an action request received from the I/O interface 1210 and provides feedback to the user that the action was performed. The provided feedback may be visual or audible feedback via the eyewear device 1205 or haptic feedback via the I/O interface 1210.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A transducer system comprising:
 a transducer configured to produce vibrations, the transducer comprising:
  a first sub-assembly including a coil assembly;
  a second sub-assembly including one or more magnets;
 a vibration isolation system configured to isolate vibrations produced by the transducer from a device the transducer system is coupled to, the vibration isolation system comprising:
  a plurality of support brackets, and
  a suspension component that includes a plurality of flexures, the plurality of flexures including:
   a first set of flexures configured to suspend the first sub-assembly from the support brackets,
   a second set of flexures configured to suspend the second sub-assembly from the first sub-assembly,
   a third set of flexures configured to suspend the second sub-assembly from the support brackets, and
   wherein one or more of the plurality of flexures are composed of a conductive material and are configured to provide electrical signals to the transducer.

2. The transducer system of claim 1, wherein the first sub-assembly and the second sub-assembly are configured to translate along a same axis.

3. The transducer system of claim 1, wherein the device is an eyewear device, and wherein the vibration isolation system is positioned on an arm of the eyewear device such that the vibration isolation system is configured to isolate vibrations produced by the transducer.

4. The transducer system of claim 1, wherein resonances of the vibration isolation system are configured to minimize acceleration of the device caused by movement of the transducer.

5. The transducer system of claim 1, wherein the plurality of flexures are symmetric about a first axis that bisects the suspension component.

6. The transducer system of claim 1, wherein the plurality of flexures are formed from a single material.

7. The transducer system of claim 6, wherein the material is selected from a group comprising: aluminum, brass, copper, steel, nickel, titanium, alloys, plastics, and a shape memory alloy.

8. The transducer system of claim 1, wherein in a neutral position of the transducer, the coil assembly is positioned between at least two magnets of the one or more magnets.

9. The transducer system of claim 1, wherein in a neutral position of the transducer, at least a portion of the coil assembly circumscribes the one or more magnets.

10. The transducer system of claim 1, wherein the transducer is coupled to a diaphragm that vibrates with the transducer to generate sound in air.

11. The transducer system of claim 1, wherein the transducer vibrates tissue of a user to generate sound via at least one of bone conduction or tissue conduction.

12. A vibration isolation system comprising:
a plurality of support brackets, and
a suspension component that includes a plurality of flexures, the plurality of flexures including:
a first set of flexures configured to suspend a first sub-assembly of a transducer from the support brackets,
a second set of flexures configured to suspend a second sub-assembly of the transducer from the first sub-assembly,
a third set of flexures configured to suspend the second sub-assembly from the support brackets,
wherein one or more of the plurality of flexures are composed of a conductive material and are configured to provide electrical signals to the transducer, and
wherein the vibration assembly is configured to isolate vibrations produced by the transducer from a device.

13. The vibration isolation system of claim 12, wherein the first sub-assembly and the second sub-assembly are configured to translate along a same axis.

14. The vibration isolation system of claim 12, wherein the device is an eyewear device, and wherein the vibration isolation system is positioned on an arm of the eyewear device such that the vibration isolation system is configured to isolate vibrations produced by the transducer.

15. The vibration isolation system of claim 12, wherein resonances of the vibration isolation system are configured to minimize acceleration of the device caused by movement of the transducer.

16. The vibration isolation system of claim 12, wherein the plurality of flexures are symmetric about a first axis that bisects the suspension component.

17. The vibration isolation system of claim 12, wherein the plurality of flexures are formed from a single material.

18. The vibration isolation system of claim 17, wherein the material is selected from a group comprising: aluminum, brass, copper, steel, nickel, titanium, alloys, plastics, and a shape memory alloy.

* * * * *